(12) United States Patent  
Yin et al.

(10) Patent No.: US 10,616,888 B2  
(45) Date of Patent: Apr. 7, 2020

(54) MULTIPLE SLOT LONG PHYSICAL UPLINK CONTROL CHANNEL (PUCCH) DESIGN FOR 5TH GENERATION (5G) NEW RADIO (NR)

(71) Applicant: Sharp Laboratories of America, Inc., Camas, WA (US)

(72) Inventors: Zhanping Yin, Vancouver, WA (US); Toshizo Nogami, Chiba (JP); Tatsushi Aiba, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1 day.

(21) Appl. No.: 16/192,114

(22) Filed: Nov. 15, 2018

(65) Prior Publication Data

US 2019/0150143 A1 May 16, 2019

Related U.S. Application Data

(63) Continuation of application No. PCT/US2018/061118, filed on Nov. 14, 2018.
(Continued)

(51) Int. Cl.
*H04W 4/00* (2018.01)
*H04W 72/04* (2009.01)
(Continued)

(52) U.S. Cl.
CPC ....... *H04W 72/0446* (2013.01); *H04L 1/1861* (2013.01); *H04L 5/0048* (2013.01);
(Continued)

(58) Field of Classification Search
None
See application file for complete search history.

(56) References Cited

U.S. PATENT DOCUMENTS 10,517,078 B2 * 12/2019 Kim ................... H04W 72/12
2015/0092702 A1 * 4/2015 Chen .................. H04W 72/082
370/329

(Continued)

FOREIGN PATENT DOCUMENTS

EP 2624480 A2 8/2013

OTHER PUBLICATIONS

International Search Report and Written Opinion issued for PCT Application No. PCT/US2018/061118 dated Jan. 29, 2019.
(Continued)

*Primary Examiner* — Clemence S Han
(74) *Attorney, Agent, or Firm* — Austin Rapp

(57) ABSTRACT

A user equipment (UE) is described. The UE includes a processor and memory in electronic communication with the processor. Instructions stored in the memory are executable to determine whether an uplink control channel (PUCCH) spans over multiple slots based on a signaling from a base station (gNB). The instructions are also executable to determine a PUCCH location in each slot in a multi-slot PUCCH. The instructions are executable to determine a number of slots in the multi-slot PUCCH. The instructions are further executable to determine whether the multi-slot PUCCH conflicts with a slot format indication (SFI). The instructions are also executable to transmit uplink control information (UCI) on a selected channel.

20 Claims, 24 Drawing Sheets

Related U.S. Application Data

(60) Provisional application No. 62/587,348, filed on Nov. 16, 2017.

(51) Int. Cl.
*H04L 5/00* (2006.01)
*H04L 1/18* (2006.01)
*H04W 76/27* (2018.01)

(52) U.S. Cl.
CPC ....... *H04W 72/0413* (2013.01); *H04W 76/27* (2018.02); *H04L 5/001* (2013.01)

(56) References Cited

U.S. PATENT DOCUMENTS

| | | | |
|---|---|---|---|
| 2019/0081763 A1* | 3/2019 | Akkarakaran | H04L 1/0026 |
| 2019/0159191 A1* | 5/2019 | Kim | H04L 5/00 |
| 2019/0342944 A1* | 11/2019 | Chatterjee | H04W 72/044 |

OTHER PUBLICATIONS

Ericsson, "Summary of the E-mail Discussion [89-21]: OnLong PUCCH for NR", TSG-RAN WGl NR AH Meeting#2, Qingdao, China, R1-17xxxxx, Jun. 30, 2017.

* cited by examiner

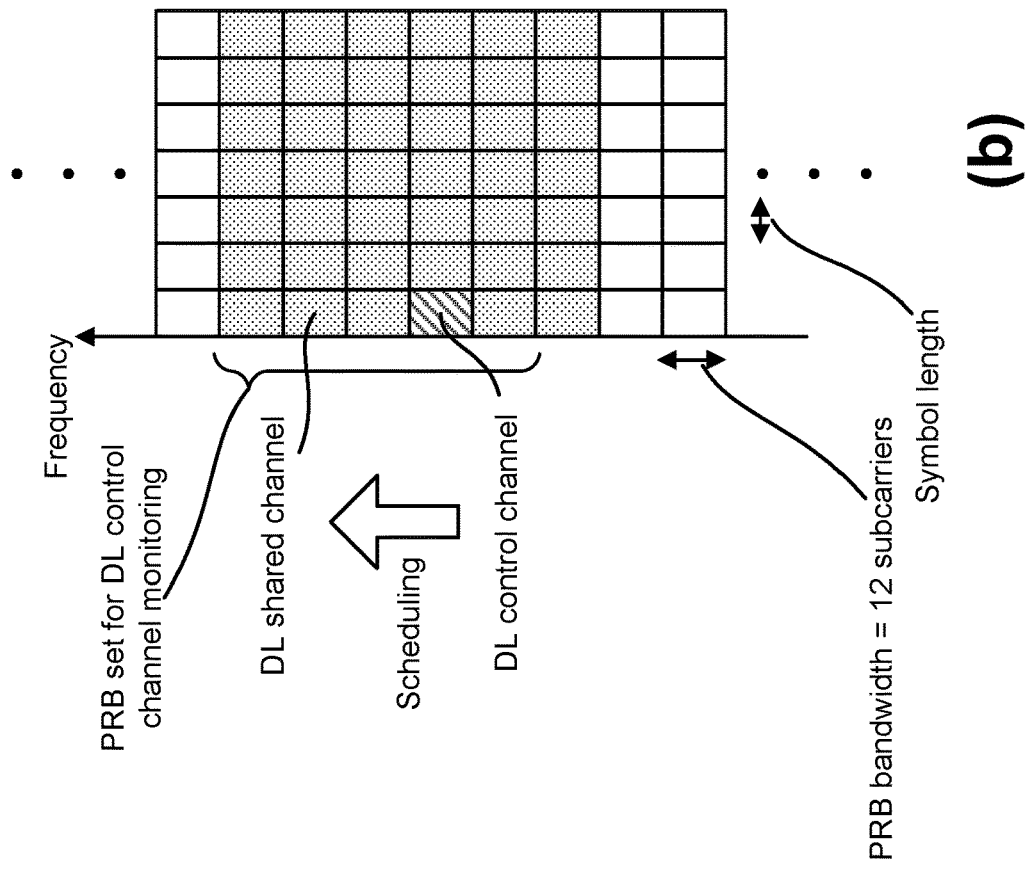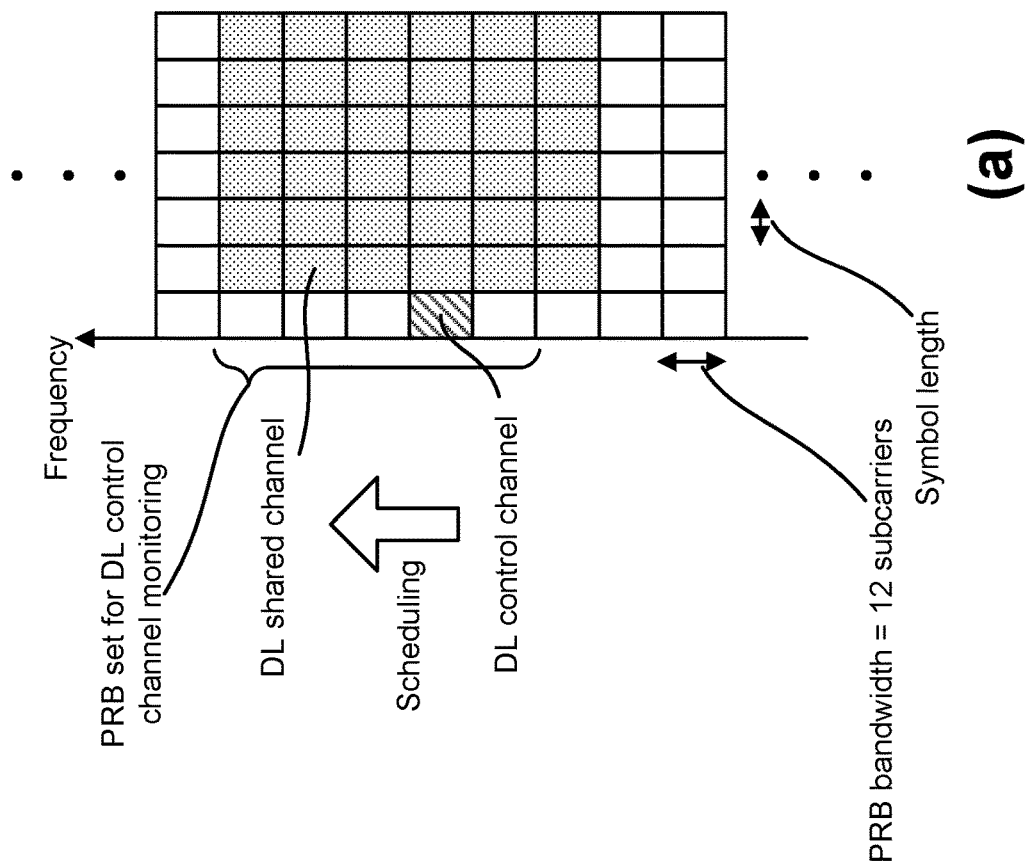
FIG. 15

US 10,616,888 B2

MULTIPLE SLOT LONG PHYSICAL UPLINK CONTROL CHANNEL (PUCCH) DESIGN FOR 5TH GENERATION (5G) NEW RADIO (NR)

RELATED APPLICATIONS

This application is related to and claims priority from U.S. Provisional Patent Application No. 62/587,348, entitled "MULTIPLE SLOT LONG PHYSICAL UPLINK CONTROL CHANNEL (PUCCH) DESIGN FOR 5th GENERATION (5G) NEW RADIO (NR)," filed on Nov. 16, 2017, which is hereby incorporated by reference herein, in its entirety.

TECHNICAL FIELD

The present disclosure relates generally to communication systems. More specifically, the present disclosure relates to multiple slot long physical uplink control channel (PUCCH) design for 5th generation (5G) new radio (NR).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

BRIEF DESCRIPTION OF THE DRAWINGS

FIG. 15 is a diagram illustrating examples of downlink (DL) control channel monitoring regions;

DETAILED DESCRIPTION

Figure 1:
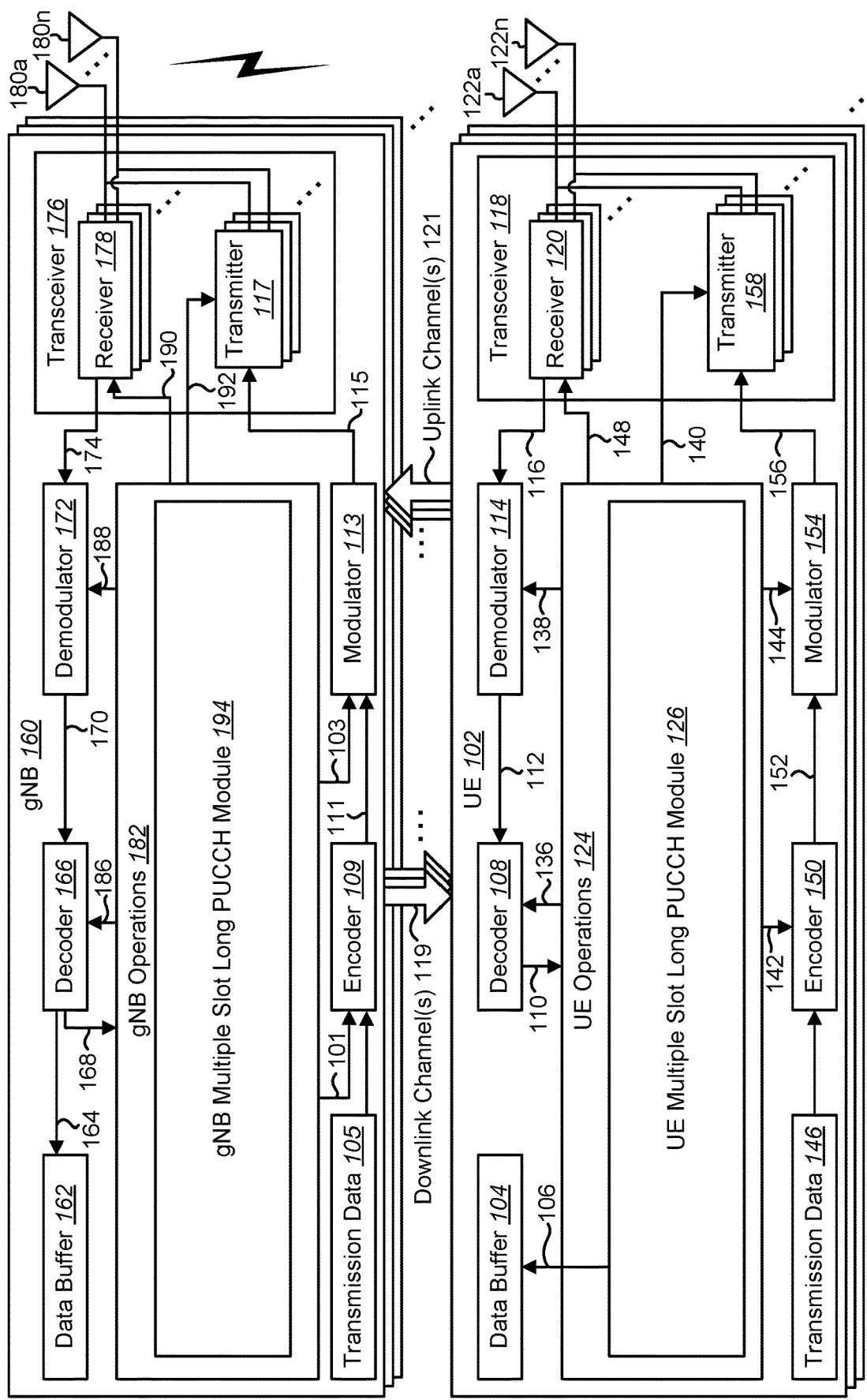
FIG. 1 is a block diagram illustrating one implementation of one or more base stations (gNBs) and one or more user equipments (UEs) in which systems and methods for multiple slot long physical uplink control channel (PUCCH) design for 5th generation (5G) new radio (NR) may be implemented.

A user equipment (UE) is described. The UE includes a processor and memory in electronic communication with the processor. Instructions stored in the memory are executable to determine whether an uplink control channel (PUCCH) spans over multiple slots based on a signaling from a base station (gNB). The instructions are also executable to determine a PUCCH location in each slot in a multi-slot PUCCH. The instructions are further executable to determine a number of slots in the multi-slot PUCCH. The instructions are additionally executable to determine whether the multi-slot PUCCH conflicts with a slot format indication (SFI). The instructions are also executable to transmit uplink control information (UCI) on a selected channel.

In one configuration, the instructions executable to determine the PUCCH location in each slot in the multi-slot PUCCH include instructions executable to determine whether each slot includes the same starting and ending positions and duration based on a radio resource control (RRC) configuration. In another configuration, the instructions executable to determine the PUCCH location in each slot in the multi-slot PUCCH include instructions executable to determine whether different slots include different starting and ending positions and durations based on a radio resource control (RRC) configuration. In still another configuration, the instructions executable to determine the PUCCH location in each slot in the multi-slot PUCCH include instructions executable to determine whether different slots include different starting and ending positions and durations based on information derived from an SLI and/or a short PUCCH configuration.

The instructions executable to determine the number of slots in the multi-slot PUCCH include instructions executable to count a number of slots with long PUCCH allocations. Continuous slots are allocated for frequency division duplexing (FDD), consecutive uplink slots are allocated for slot level time division duplexing (TDD), and the long PUCCH follows a pattern that includes slot gaps.

The instructions executable to determine whether the multi-slot PUCCH conflicts with an SLI include instructions executable to determine whether a long PUCCH includes a symbol with a different allocation. The instructions are further executable to transmit a punctured long PUCCH by dropping conflicting symbols. The instructions are further executable to drop a long PUCCH in a given slot without extension. The instructions are further executable to drop a long PUCCH in a given slot and to extend a later slot to maintain the number of slots in the multi-slot PUCCH.

A method is described. The method includes determining whether an uplink control channel (PUCCH) spans over multiple slots based on a signaling from a base station (gNB). The method further includes determining a PUCCH location in each slot in a multi-slot PUCCH. The method additionally includes determining a number of slots in the multi-slot PUCCH. The method also includes determining whether the multi-slot PUCCH conflicts with a slot format indication (SFI). The method further includes transmitting uplink control information (UCI) on a selected channel.

In one configuration, determining the PUCCH location in each slot in the multi-slot PUCCH includes determining whether each slot includes the same starting and ending positions and duration based on a radio resource control (RRC) configuration. In another configuration, determining the PUCCH location in each slot in the multi-slot PUCCH includes determining whether different slots include different starting and ending positions and durations based on a radio resource control (RRC) configuration. In still another configuration, determining the PUCCH location in each slot in the multi-slot PUCCH includes determining whether different slots include different starting and ending positions and durations based on information derived from an SLI and/or a short PUCCH configuration.

Determining the number of slots in the multi-slot PUCCH includes counting a number of slots with long PUCCH allocations. Continuous slots are allocated for frequency division duplexing (FDD), consecutive uplink slots are allocated for slot level time division duplexing (TDD), and the long PUCCH follows a pattern that includes slot gaps.

Determining whether the multi-slot PUCCH conflicts with an SLI includes determining whether a long PUCCH includes a symbol with a different allocation. The method may also include transmitting a punctured long PUCCH by dropping conflicting symbols. The method may further include dropping a long PUCCH in a given slot without extension. The method may additionally include dropping a long PUCCH in a given slot and to extend a later slot to maintain the number of slots in the multi-slot PUCCH.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may consist of a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio", "New Radio Access Technology" or "NR" by 3GPP) envisions the use of time/frequency/space resources to allow for enhanced mobile broadband (eMBB) communication and ultra-reliable low latency communication (URLLC) services, as well as massive machine type communication (mMTC) like services. In order for the services to use the time/frequency/space medium efficiently it would be useful to be able to flexibly schedule services on the medium so that the medium may be used as effectively as possible, given the conflicting needs of URLLC, eMBB, and mMTC. A new radio base station may be referred to as a gNB. A gNB may also be more generally referred to as a base station device.

In 5G NR, at least two different types of uplink control channel (PUCCH) formats may be specified: at least one short PUCCH format and one long PUCCH format. The PUCCH channel is designed to carry uplink control information (UCI). In NR, the long PUCCH format may span over multiple slots, and the PUCCH format of a UE may be configured by a base station. The systems and methods described herein detail formats for long PUCCH design over multiple slots. In particular, length restrictions in each slot, reference signal (RS) patterns in each slot, frequency hopping methods and UCI coding methods for a long PUCCH over multiple slots are described. The systems and methods described herein also detail the long PUCCH position in each slot and the slot counter handling in case of conflict with a slot format indication (SFI).

For a long PUCCH that spans over multiple slots, a long PUCCH may occupy continuous UL symbols only, or a long PUCCH can include discontinuous symbols in time domain. Some restrictions may be applied to the length in each slot. The demodulation reference signal (DMRS) pattern of a long PUCCH over multiple slots may be determined by the DMRS pattern of each slot following its own length. Frequency hopping may be applied inter-slot or intra-slot based on configurations. Different UCI encoding and rate matching methods can be applied based on the UCI payload size and the long PUCCH resources in each slot.

In addition, this disclosure may describe how to determine the long PUCCH position of multi-slot PUCCH with the same or different durations in each slot. This disclosure may also describe how to count the number of slots in a multi-slot PUCCH. The disclosure may further describe how to handle conflicts with a slot format indicator (SFI), also known as slot format related information, slot format indication, etc. A SFI may be transmitted in a group-common PDCCH (GC-PDCCH) that can indicate the slot format related information for one or more slots. UE can be configured to monitor SFI in group common PDCCH for a Scell on a different cell Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for multiple slot long physical uplink control channel (PUCCH) design for 5th generation (5G) new radio (NR) may be implemented. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH and a PUSCH, etc. The one or more gNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include one or more of a UE multiple slot long PUCCH module 126.

The UE multiple slot long PUCCH module 126 may implement a multiple slot long PUCCH design for 5th generation (5G) new radio (NR) as described herein.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH hybrid automatic repeat request acknowledgment (HARQ-ACK) information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115. The one or more receivers 178 may further receive information 190 from gNB operations module 182.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB multiple slot long PUCCH module 194. The gNB long PUCCH module 194 may implement a multiple slot long PUCCH design for 5G NR as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

The physical uplink control channel for NR may support multiple formats as shown it Table 1. Simultaneous transmission of two PUCCHs with format 0 or 2, or simultaneous transmission of one PUCCH with format 1 or 3 and one PUCCH with format 0 or 2 from a single UE may be supported.

TABLE 1

| PUCCH format | Length in OFDM symbols | Number of bits |
|---|---|---|
| 0 | 1-2 | ≤2 |
| 1 | 4-14 | ≤2 |
| 2 | 1-2 | >2 |

TABLE 1-continued

| PUCCH format | Length in OFDM symbols | Number of bits |
|---|---|---|
| 3 | 4-14 | >2, < N |
| 4 | 4-14 | > N |

PUCCH format 0 may be a short PUCCH with up to 2 bits of UCI. PUCCH format 0 may use sequences to indicate the UCI values. PUCCH format 0 may occupy a single resource block (RB) by default and 1 or 2 symbols in a slot.

PUCCH format 1 may be a long PUCCH with up to 2 bits of UCI. PUCCH format 1 may use sequences to indicate the UCI values. PUCCH format 1 may occupy a single RB by default and 4-14 symbols in a slot. Time domain orthogonal cover code (OCC) may be applied for PUCCH multiplexing with other UEs.

PUCCH format 2 may be a short PUCCH with more than 2 bits of UCI. PUCCH format 2 may use orthogonol frequency division multiplexing (OFDM) with UCI and DMRS multiplexing in a RB. PUCCH format 2 may occupy 1 or 2 symbols in a slot with configurable RBs to allow different number of UCI payload sizes.

PUCCH format 3 may be a long PUCCH with more than 2 bits of UCI without UE multiplexing. PUCCH format 3 may use DFT-S-OFDM and time division multiplexing (TDM) between UCI and DMRS. PUCCH format 3 may occupy 4-14 symbols in a slot with configurable RBs to allow different number of UCI payload sizes.

PUCCH format 4 may be a long PUCCH with more than 2 bits of UCI with UE multiplexing. PUCCH format 4 may use DFT-S-OFDM and TDM between UCI and DMRS. PUCCH format 3 may occupy 4-14 symbols in a slot. Pre-DFT OCC may be applied for PUCCH multiplexing with other UEs.

Therefore, for PUCCH format configuration, a combination of semi-static configuration and (at least for some types of UCI information) dynamic signaling is used to determine the PUCCH formats and resources both for the long and short PUCCH formats.

TABLE 2

Parameters configured in PUCCH resource sets and their value ranges

| | | PUCCH Format 0 | PUCCH Format 1 | PUCCH Format 2 | PUCCH Format 3 | PUCCH Format 4 |
|---|---|---|---|---|---|---|
| Starting Slot | Configurability Value Range | Configured 0-x | Configured 0-x | Configured 0-x | Configured 0-x | Configured 0-x |
| Starting Symbol | Configurability Value Range | Configured 0-13 (such a configuration may be conditioned on non-slot based operation) | Configured 0-10 | Configured 0-13 (such a configuration may be conditioned on non-slot based operation) | Configured 0-10 | Configured 0-10 |
| Number of symbols in a slot | Configurability Value Range | Configured 1, 2 | Configured 4-14 | Configured 1, 2 | Configured 4-14 | Configured 4-14 |
| Index for identifying starting physical resource block (PRB) | Configurability Value Range | Configured (implicit derivation may also be used) 0-274 | Configured (implicit derivation may also be used) 0-274 | Configured 0-274 | Configured 0-274 | Configured 0-274 |
| Number of PRBs | Configurability Value Range | N.A. N.A. (Default is 1) | N.A. N.A. (Default is 1) | Configured 1-16 | Configured 1-6, 8-10, 12, 15, 16 | N.A. N.A. (Default is 1) |
| Enabling a frequency hopping | Configurability Value Range | Configured On/Off (only for 2 symbols) | Configured On/Off | Configured On/Off (only for 2 symbols) | Configured On/Off | Configured On/Off |

TABLE 2-continued

Parameters configured in PUCCH resource sets and their value ranges

| | | PUCCH Format 0 | PUCCH Format 1 | PUCCH Format 2 | PUCCH Format 3 | PUCCH Format 4 |
|---|---|---|---|---|---|---|
| Frequency resource of second hop if frequency hopping is enabled | Configurability | Configured h1-h2 if configured | Configured h1-h2 if configured | Configured h1-h2 if configured | Configured h1-h2 if configured | Configured h1-h2 if configured |
| Index of initial cyclic shift | Configurability | Yes (implicit derivation may also be used) | Yes (implicit derivation may also be used) | N.A. | Yes/No (for DMRS) | Yes/No (for DMRS) |
| | Value Range | 0-11 | 0-11 | N.A. | 0-11 | 0-11 |
| Index of time-domain OCC | Configurability | N.A. | Configured (implicit derivation may also be used) | N.A. | N.A. | N.A. |
| | Value Range | N.A. | 0-6 | N.A. | N.A. | N.A. |
| Length of Pre-DFT OCC | Configurability | N.A. | N.A. | N.A. | N.A. | Configured |
| | Value Range | N.A. | N.A. | N.A. | N.A. | 2, 4 |
| Index of Pre-DFT OCC | Configurability | N.A. | N.A. | N.A. | N.A. | Configured |
| | Value Range | N.A. | N.A. | N.A. | N.A. | 0, 1, 2, 3 |

TABLE 3

Semi-statically-configured parameters and their value ranges

| | | PUCCH Format 0 | PUCCH Format 1 | PUCCH Format 2 | PUCCH Format 3 | PUCCH Format 4 |
|---|---|---|---|---|---|---|
| Starting Slot | Configurability | N.A. | Configured | N.A. | Configured | Configured |
| | Value Range | N.A. | 1, y1, y2, y3 | N.A. | 1, y1, y2, y3 | 1, y1, y2, y3 |

For a long PUCCH, multi-slot transmission may be supported with configurable number of slots. For long PUCCH over multi-slots, for the case duration of long PUCCH in each slot is the same, the number of slots with long PUCCH transmission may be configurable in a UE-specific manner. Up to 4 possible RRC configured numbers may be configured in RRC signaling. The possible RRC configured numbers are shown as 1, y1, y2, y3 in Table 3.

This disclosure may focus on some details of multi-slot long PUCCH (including format 1/3/4), including: long PUCCH location in each slot; counting of the number of slots; and handling of conflicting slot structure between a configured long PUCCH format and the SFI. For multi-slot long PUCCH, long PUCCH duration—e.g. PUCCH format 1/3/4—may have a duration of 4-14 symbols in a slot. Therefore, a long PUCCH may occupy part of the symbols of a UL centric or UL only slot; a long PUCCH may occupy all symbols of a UL centric or UL only slot; and a long PUCCH may occupy part of the symbols of a UL centric or UL only slot.

Figure 2:
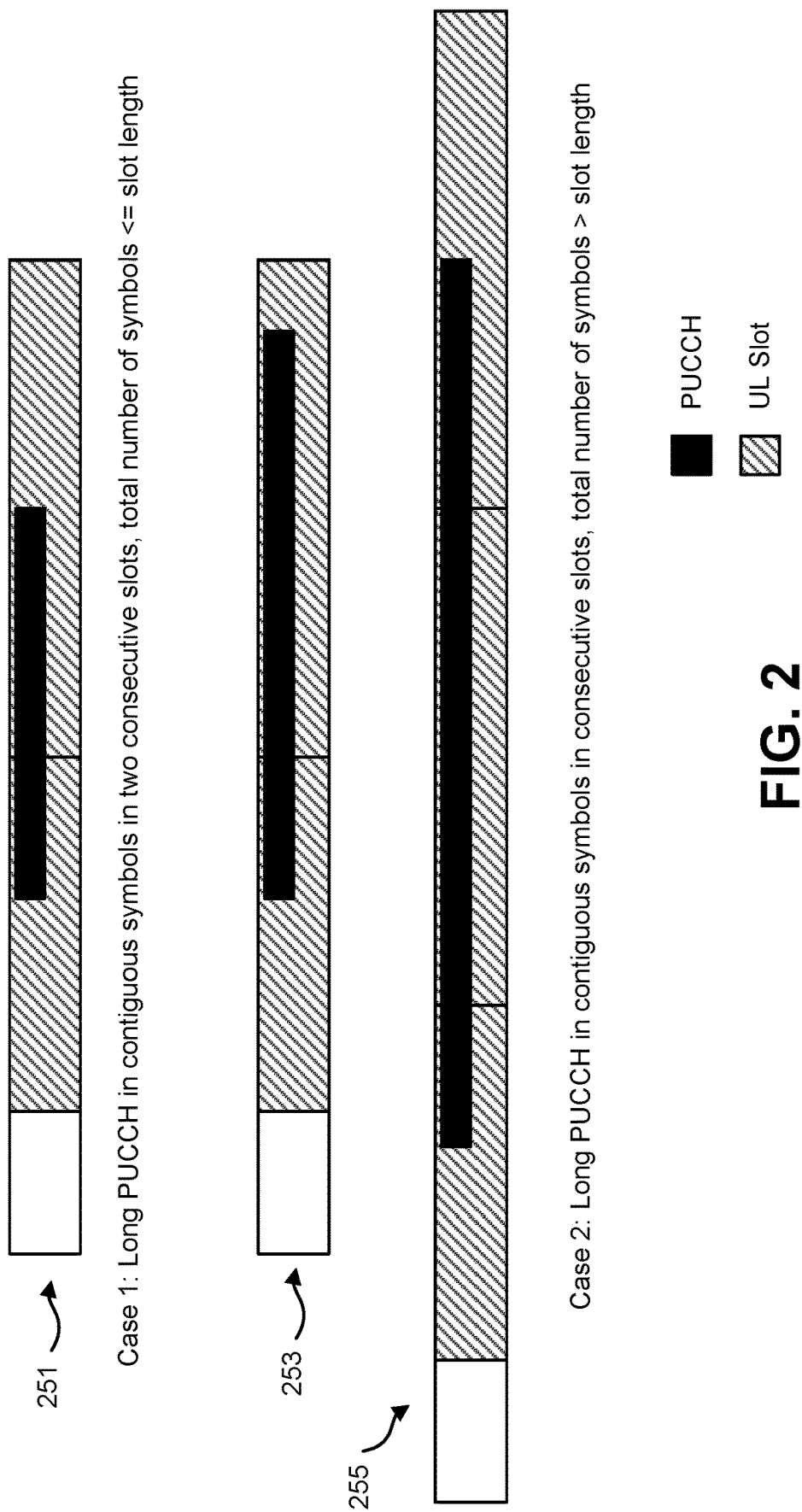
FIG. 2 is a diagram illustrating different cases for multiple slot long PUCCH with continuous uplink (UL) symbol.

FIG. 2 is a diagram illustrating different cases 251, 253, and/or 255 for multiple slot long PUCCH with continuous UL symbol. A long PUCCH may span over multiple slots. This may be useful for large payload size, flexible resource allocation and better coverage. Several aspects may be considered for a long PUCCH over multiple slots.

In a first aspect, long PUCCH over multiple slots with continuous UL symbols may be considered. In one method, a long PUCCH over multiple slots may occupy continuous UL symbols in multiple slots, i.e. no gap is allowed within a long PUCCH. Under this condition, there may be several cases as shown in FIG. 2.

In a first case 251, the long PUCCH may start in one slot, and may end in the slot after, and the number of symbols may be greater than or equal to 4, and less than or equal to the number of symbols in a slot. In one approach, since the length is smaller than a slot length, this case 251 may be treated as a long PUCCH within a slot, and the same DMRS structure and frequency hopping methods defined for single slot structure may be used. In other words, a single slot long PUCCH may support floating positions that may start from any symbol and may end at any symbol in the same or consecutive slot. Similarly, the same UCI encoding and rate matching methods as in long PUCCH within a slot may be applied in this case 251, and OCC may be applied in frequency domain and/or time domain. With this approach, the UCI encoding and rate matching methods may be the same as a long PUCCH within a slot, i.e. OCC may be applied in frequency domain and/or time domain over all UCI carrying symbols in the long PUCCH.

In another approach, the DMRS pattern may be determined on a per slot basis, i.e. the DMRS may be optimized based on the number of PUCCH symbols in each slot. In yet another approach, a common DMRS pattern, i.e. the same DMRS pattern, may be applied in both slots. For example, a full slot DMRS pattern may be applied in each slot, with unused UL symbols punctured out. This may provide a simple solution with fixed DMRS locations. In both slot structure based approaches, some further restrictions may be applied, e.g. the number of PUCCH symbols in each slot may be greater than or equal to 4.

For frequency hopping, several methods may be considered. In one method, only one hop may be applied with inter-slot hopping at slot boundary. This may reserve the PUCCH structure in each slot. In another method, since each slot may be greater than or equal to 4 symbols, intra-slot hopping may be applied in each slot. Thus, multiple hopping may occur during the multi-slot PUCCH transmission.

In a second case 253 and/or 255, a multiple slot long PUCCH may start in one slot, and may end in another slot after the starting slot, and the number of symbols in a long PUCCH may be greater than the number of symbols in a slot. Since the multi-slot PUCCH may be longer than the slot length, the existing slot structure may not be applied directly. Several approaches may be considered for the second case 253 and/or 255.

In one approach, the DMRS pattern may be determined on a per slot basis, i.e. the DMRS may be optimized based on the number of PUCCH symbols in each slot, as provided above for slot structure. In yet another approach, a common DMRS pattern, i.e. the same DMRS pattern, may be applied in both slots. For example, a full slot DMRS pattern may be applied in each slot, with unused UL symbols punctured out. This may provide a simple solution with fixed DMRS locations. In both approaches, some further restrictions may be applied, e.g. the number of PUCCH symbols in each slot may be greater than or equal to 4.

Since a multi-slot long PUCCH may occupy continuous symbols in adjacent slots, for UCI encoding and rate matching on multi-slot long PUCCH resources, several methods may be considered. In a first method, joint encoding and rate matching over all available UCI carrying symbols may be considered. The UCI may be encoded and the encoded bits may be rate matched to all UCI carrying symbols of the multi-slot long PUCCH. This may be similar to a long PUCCH within a slot, i.e. OCC may be applied in frequency domain and/or time domain over all UCI carrying symbols in the long PUCCH.

In a second method, joint UCI encoding with separate rate matching and bit loading to each slot may be considered. The UCI may be encoded. The encoding output may be rate matched to the available UCI carrying symbols in each slot independently. With this method, each slot may be viewed as a long PUCCH, and the same UCI may be encoded and repeated in consecutive long PUCCHs in different slots.

In a third method, the UCI bits may be segmented into multiple segments, each segment for each slot of a multi-slot PUCCH. Each UCI segment may be separately encoded and rate matched to the PUCCH symbols in the given slot. The UCI bits may be segmented proportional to the number of UCI carrying symbols in each slot.

Although the third method may simplify the UCI encoding in each slot, it may reduce the joint coding gain of all UCI bits compared with the first method and the second method. In the second method, since different slots may have different number of PUCCH symbols, the coding rate may be different in different slots, especially if the number of PUCCH symbols in one or more slots is too small, the encoded UCI bit may not fit into the available resources. Therefore, the first method may be preferred for a multi-slot long PUCCH with continuous symbols.

With the second method, the rate matching in each slot may be determined by a redundant version (RV) sequence. That is, different RVs of the same encoded UCI may be loaded to different slots. The RV sequence may follow a default sequence. The RV sequence may be configured by higher layer signaling. The sequence may determine if the same RV or different RVs are applied in different slots.

Alternatively, the first method and the second method may be determined based on the minimum available PUCCH resource in all slots. If the encoded bits can fit in PUCCH UCI carrying symbols in all configured slots, the second method (joint coding with repetition in each slot) may be used. Otherwise, the first method (joint coding and rate matching among all slots) may be used.

For both the first case 251 and the second case 253 and/or 255, since the UL symbols may be continuous in multiple slots, the following may be considered. If there are only 2 slots, the position of the long PUCCH in each slot may be different. In the first slot, the long PUCCH may end at the end of the slot, and in the second slot, the long PUCCH may start at the first symbol of the slot. The long PUCCH duration in each slot may be the same or different.

If there are more than 2 slots, for continuous symbols in multi-slot PUCCH, the long PUCCH duration in different slots may be different. In the first slot, the long PUCCH may end at the end of the slot. In the middle slot(s), the long PUCCH may occupy all 14 symbols of the slot(s). In the last slot, the long PUCCH may start at the first symbol of the slot.

In a second aspect, long PUCCH over multiple slots that allow discontinuous UL symbols may be considered. The continuous UL symbols in continuous UL slots may be too restrictive for a multi-slot long PUCCH. In a more general case, gaps may be allowed within a long PUCCH transmission. In configured slots for a long PUCCH, some symbols may be allocated for a long PUCCH in each slot. The PUCCH symbols in a slot may be continuous, but the symbols in different slots may have gap in between. Furthermore, more detailed cases may be considered as follows.

In a third case, for long PUCCH over multiple slots, the case that the duration of long PUCCH in each slot is the same may at least be supported. In the third case, the number of PUCCH symbols for the given long PUCCH may be the same in each configured slot. The PUCCH symbols in each slot may be continuous and the number of PUCCH symbols in each slot may be greater than or equal to 4, i.e, each slot in the multiple slots for long-PUCCH over multiple slots may always be contained with a slot. However, the position of the long PUCCH within a slot may need further clarifications.

Figure 3:
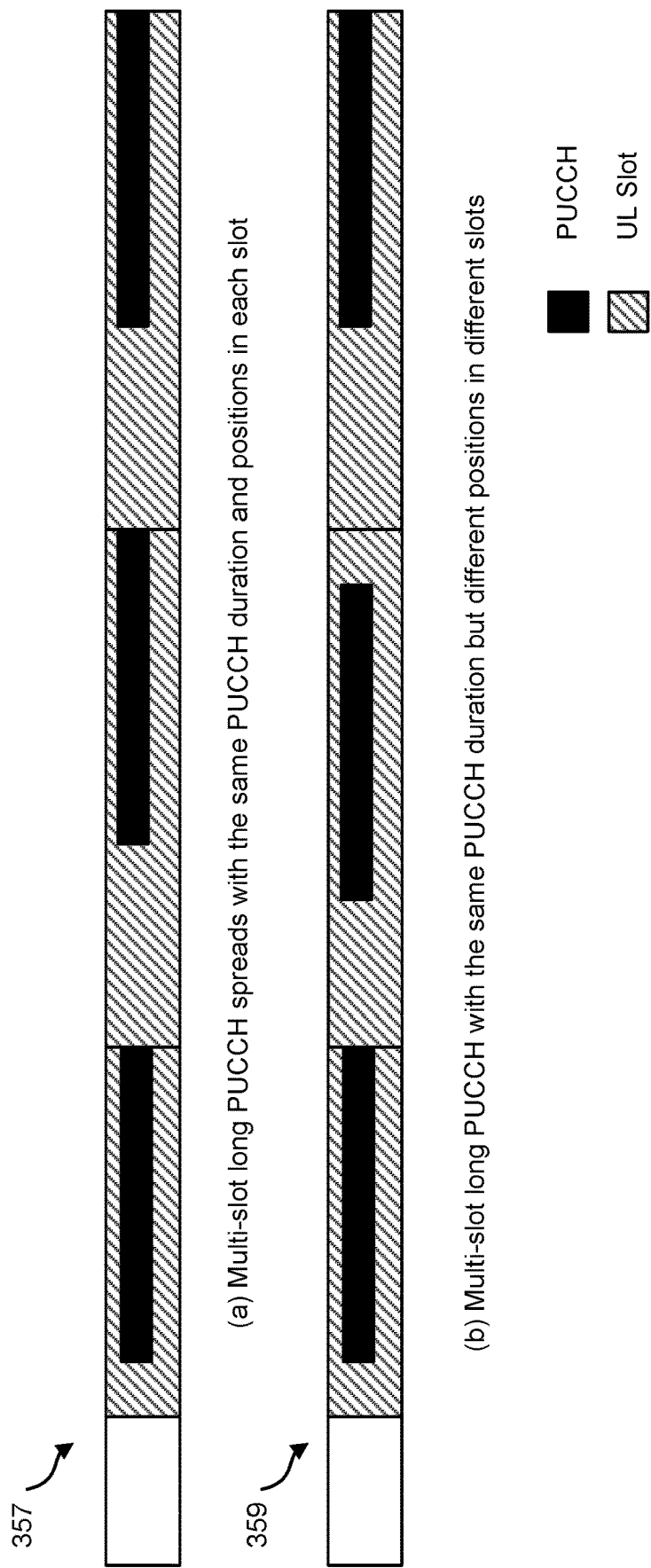
FIG. 3 is a diagram illustrating examples of multi-slot long PUCCH with the same duration in all slots.

FIG. 3 is a diagram illustrating examples 357 and/or 359 of multi-slot long PUCCH with the same duration in all slots. In one scenario 357, the same PUCCH symbol location may be allocated in each slot, as shown in (a) of FIG. 3, i.e., the long PUCCH in each slot of a multi-slot PUCCH has the same starting symbol location and the ending symbol location. This may be the simplest method, and only a single long PUCCH structure may need to be indicated by the gNB. For example, the long PUCCH configuration in the first slot may be applied in all other slots in a multi-slot long PUCCH. Thus, this may reduce the signaling overhead. This method may be preferred for the FDD case where all symbols are available in a UL slot. In this scenario, the long PUCCH format may be configured by RRC and may be applied to all slots of a multi-slot long PUCCH. In the multi-slot case, only the long PUCCH format of the first slot needs to be configured.

In another scenario 359, different PUCCH symbol locations may be applied in different slots even though the number of PUCCH symbols in each slot may be the same. Thus, the long PUCCH may start from different symbol indexes in different slots, as shown in (b) of FIG. 3. This may happen if the slots have different UL and DL symbol allocations, or some UL symbols are reserved for short PUCCH transmissions. In order to indicate the long PUCCH position in each slot, extra configuration or signaling may be needed.

For example, in one method, besides the long PUCCH duration, the starting symbol or the ending symbols may be configured for each slot. This information may be configured by RRC signaling or implicitly derived based on other configurations and downlink control indicator (DCI), such as slot format indicator (SFI), short PUCCH configuration, etc.

In another case, a UE may be configured with short PUCCH region in some slots, e.g. on the last or two symbols. Thus, in another method, for a long PUCCH spans over multiple slots with the same duration, if a short PUCCH region is configured, the long PUCCH with the given duration may end immediately before the configured short PUCCH region. This may apply if a UE is not configured or does not support simultaneous short PUCCH and long PUCCH transmission in the same symbol.

In a TDD case, dynamic DL/UL allocation may be supported by semi-static SFI configuration, and may be dynamically modified with dynamic SFI in a DCI of a GC-PDCCH. Thus, the location and the number of UL symbols in a slot may be modified dynamically.

For a dynamic TDD case, if the slots have different slot format, e.g. DL and UL symbol allocations, for a multi-slot long PUCCH with the same duration, the following methods may be considered. In one method, the long PUCCH in a slot with a given duration may start from the first available UL symbol in the slot. Or more generally, the long PUCCH in a slot with a given duration may start from a configured symbol position in the slot. In another method, the long PUCCH in a slot with a given duration may end at the last UL symbol in the slot. Or more generally, the long PUCCH in a slot with a given duration may end at a configured symbol position in the slot. In yet another method, a UE may be configured with short PUCCH region in some slots, e.g. on the last or two symbols. For a long PUCCH that spans over multiple slots with the same duration, if a short PUCCH region is configured, the long PUCCH with the given duration may end immediately before the configured short PUCCH region. In still another method, besides the long PUCCH duration, the starting symbol or the ending symbols may be configured for each slot.

Figure 4:
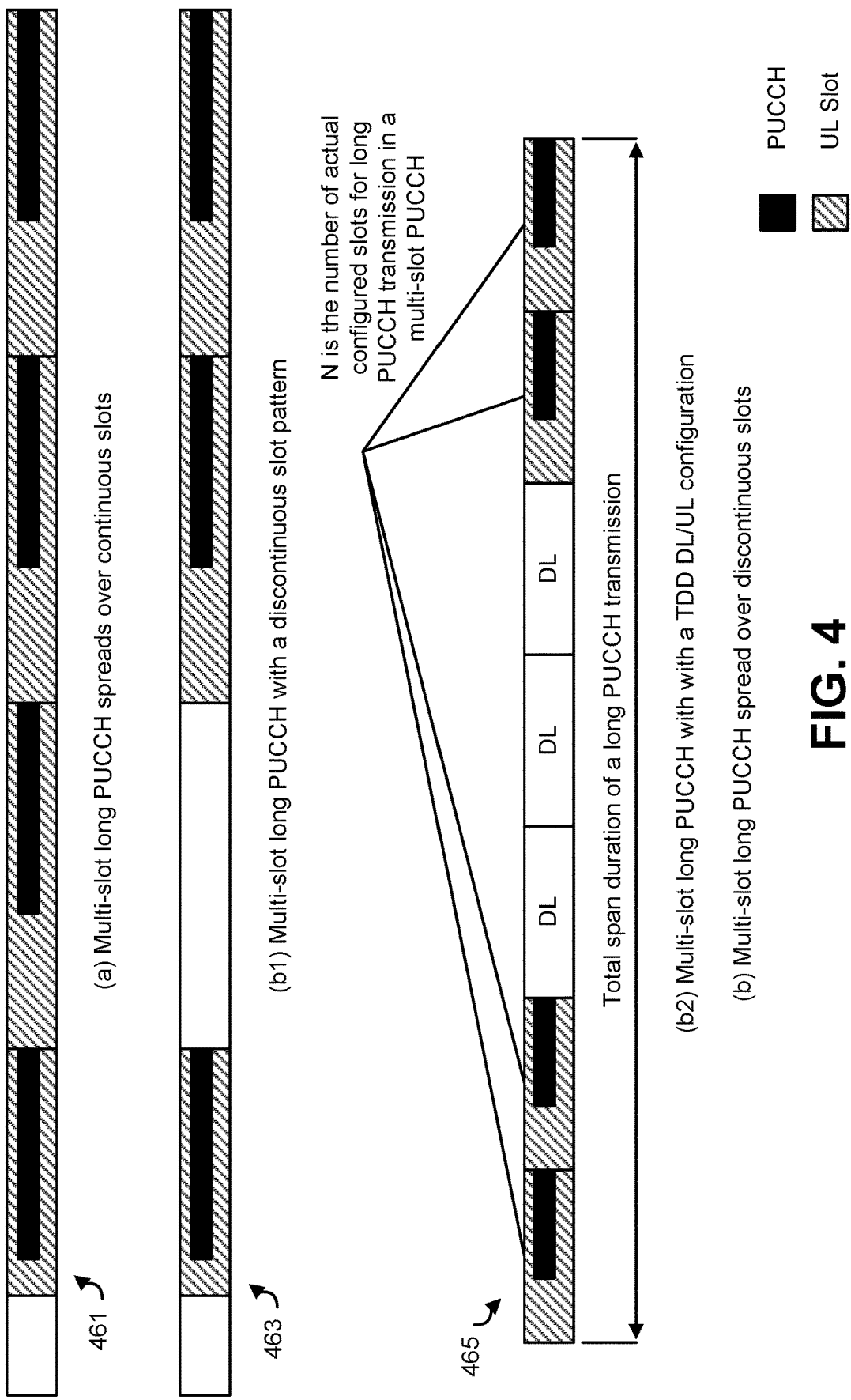
FIG. 4 is a diagram illustrating examples of how multi-slot long PUCCH may span over continuous or discontinuous slots.

FIG. 4 is a diagram illustrating examples 461, 463, and/or 465 of how multi-slot long PUCCH may span over continuous or discontinuous slots. For long PUCCH over multi-slots, for the case 461 duration of long PUCCH in each slot is the same, the number of slots N with long PUCCH transmission may be configurable in a UE-specific manner. Up to 4 possible RRC configured numbers may be possible, noted as [1, y1, y2, y3]. For example, the values of y1, y2, y3 may be selected as a subset of [2, 4, 6, 8, 10, 12, 16].

Besides the number of slots N for a multi-slot long PUCCH, more information may be utilized to determine the long PUCCH transmission. In one case 461, the N configured slots for a long PUCCH may be allocated in continuous slots, as shown in (a) of FIG. 4. This may be a desirable configuration for FDD cases. Thus, for FDD, a multi-slot long PUCCH may be allocated in N continuous slots, where N may be the configured number of slots in a multi-slot long PUCCH. In another case 465, the N configured slots for a long PUCCH may be allocated in discontinuous slots, as shown in (b) of FIG. 4, where (b) of FIG. 4 includes both (b1) and (b2) of FIG. 4. In still another case 463, A discontinuous slot pattern may be configured for a multi-slot long PUCCH as in (b1) of FIG. 4. As a special case 465, for a cell with semi-static TDD DL/DL configuration at slot level, the N slots may be counted as continuous UL slots from the starting long PUCCH slot, as shown in (b2) of FIG. 4. In case of discontinuous slot multi-slot long PUCCH, the number of slots N for the multi-slot PUCCH configuration may account for the actual number of configured slots with the long PUCCH transmission in a multi-slot PUCCH, not the total span duration of the multi-slot long PUCCH transmission.

Figure 5:
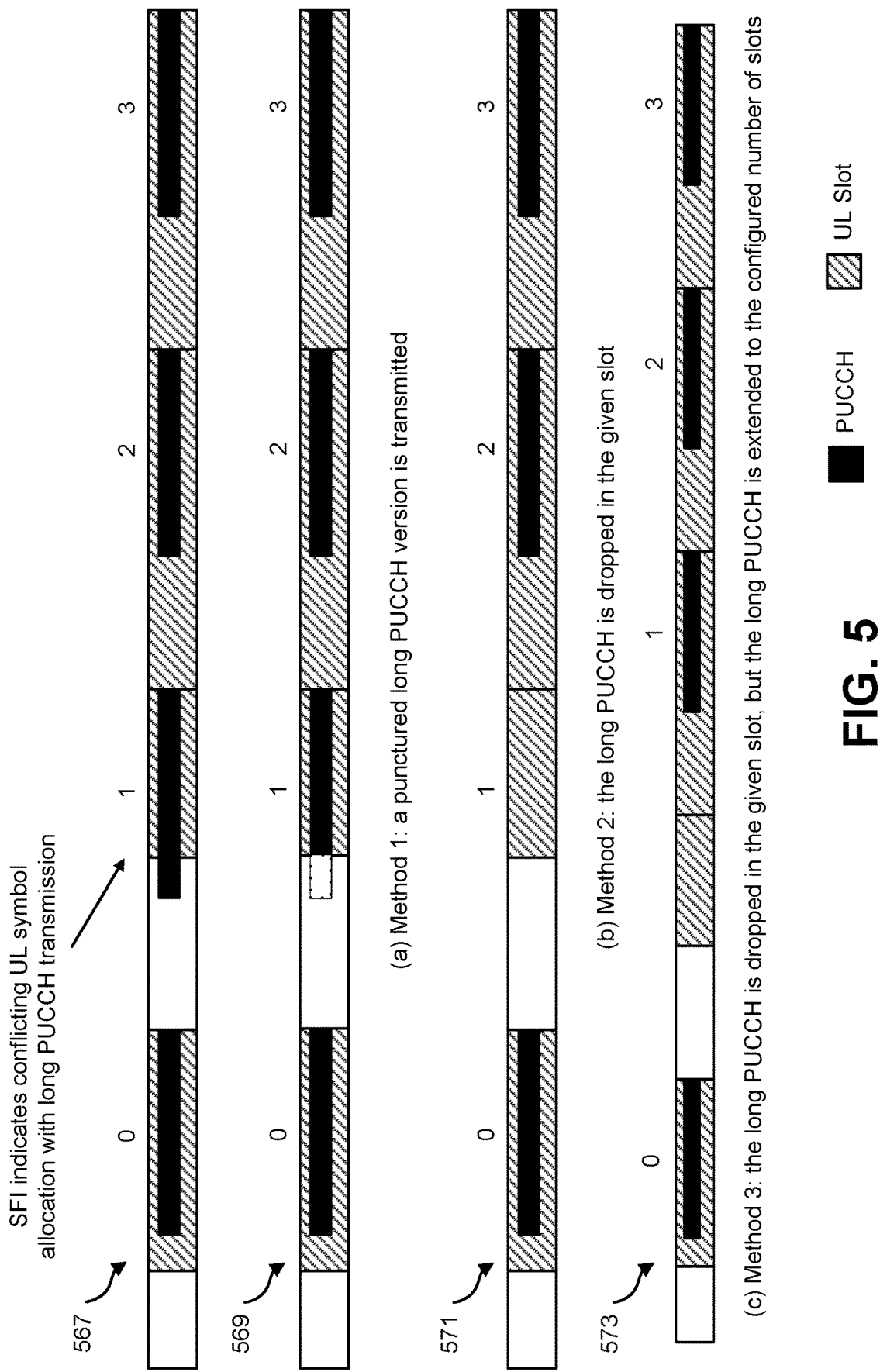
FIG. 5 is a diagram illustrating examples of slot format indication (SFI) conflict handling of long PUCCH transmissions.

FIG. 5 is a diagram illustrating examples 567, 569, 571, and/or 573 of SFI conflict handling of long PUCCH transmissions. In dynamic TDD case, semi-static SFI and dynamic SFI may be used to indicate the DL and UL symbol allocations in a slot. Especially, with dynamic SFI, the slot configuration may be changed dynamically in every slot or a in a few slots.

For a configured multi-slot long PUCCH with the same duration in each slot, it may not be feasible to dynamically change the configured symbol location or duration in a slot.

In one example 567, the long PUCCH may conflict with a SFI if any symbol in the configured long PUCCH duration has a different allocation, i.e. it is allocated as DL instead of UL symbol. In a slot where long PUCCH is configured, if the SFI indicates a conflicting UL symbol allocation, the long PUCCH may not be transmitted as configured, e.g. the number of UL symbols indicated in the SFI may be less than the configured long PUCCH duration, or one or more symbols in the configured long PUCCH duration may be indicated as DL symbol(s).

In one configuration, several methods may be considered. In a first method 569, a punctured version of the long PUCCH may be transmitted, as shown in (a) of FIG. 5. Thus, the PUCCH symbols may not be transmitted in conflicting symbols with SFI. However, the PUCCH structure itself may not be modified, e.g. the DMRS location and UCI encoding and loading may be the same as a long PUCCH without puncturing. This may cause degradation of long PUCCH in the given slot.

In a second method 571, the long PUCCH may be dropped in the given slot, as shown in (b) of FIG. 5. Thus, the actual transmitted number of slots for the multi-slot PUCCH may be reduced.

In a third method 573, the long PUCCH may be dropped in the given slot, but to maintain the performance of multi-slot PUCCH, the long PUCCH may be extended to the later slots so that the actual transmitted number of slots N may still be the same as configured. Note this may cause some collision issues with the same or other UEs using a later slot.

Only one of the above-mentioned methods may be defined in the specifications. Or, the method may be determined based on higher layer signaling. Alternatively, the method may be selected based on the long PUCCH formats. For example, if the multi-slot long PUCCH is based on PUCCH format 1, i.e. long PUCCH with up to 2 bits of UCI, puncturing some symbols or dropping the PUCCH may not have a significant impact on the overall performance. Thus, the first method or the second method may be used. If the multi-slot long PUCCH is based on PUCCH format 3 or format 4, i.e. long PUCCH with more than 2 bits of UCI, dropping a PUCCH in a slot may lead to poor performance, thus, the third method may be used. The first method may also be used if the number of punctured symbols is small compared to the duration of the long PUCCH.

Figure 6:
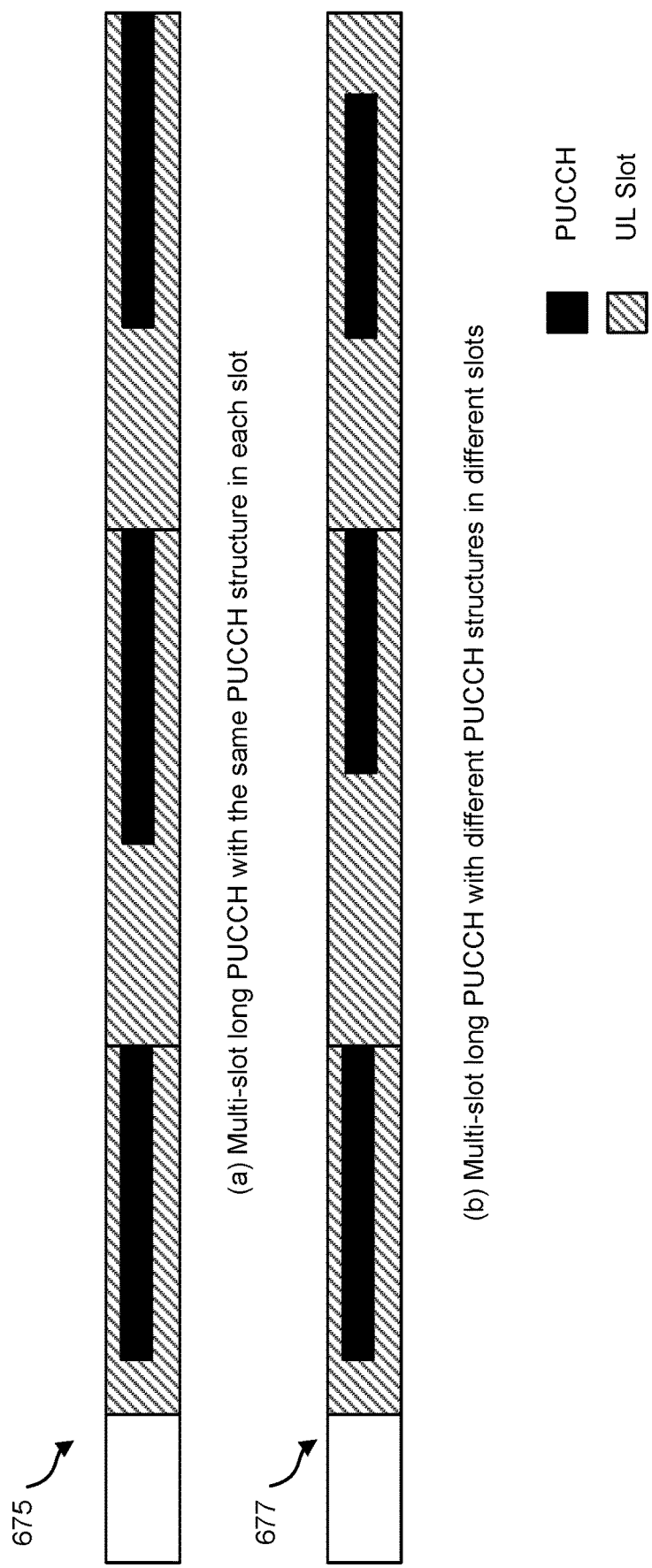
FIG. 6 is a diagram illustrating how the number of PUCCH symbols in each slot may be the same or different.

FIG. 6 is a diagram illustrating how the number of PUCCH symbols in each slot may be the same or different. In a fourth case, for long PUCCH over multiple slots, different durations in different slots may also be supported. Although the same duration in all slots may be desirable for a multi-slot long PUCCH, it may not always be possible in some cases, e.g. different slots may have different DL and UL symbol allocations, some symbols may be used for other UL channel transmissions, e.g. a short PUCCH or a sounding reference signal (SRS). Therefore, to allow more flexibility, different slot may be configured with different number of symbols in a multi-slot long PUCCH, as shown in FIG. 6. The third case may be considered as a special case of the fourth case. Even with different durations in each slot, the PUCCH symbols in each slot may be continuous and the number of PUCCH symbols in each slot may be greater or equal to 4, i.e, each slot in the multiple slots for long-PUCCH over multiple slots may always be contained with a slot.

With the fourth case, different PUCCH symbol locations and durations may be applied in different slots. Thus, the long PUCCH may start from different symbol indexes in different slots. This may happen if the slots have different UL and DL symbol allocations, or some UL symbols are reserved for short PUCCH transmissions. In order to indicate the long PUCCH position in each slot, extra configuration or signaling may be needed.

For example, for each slot, besides the long PUCCH duration, the starting symbol or the ending symbols may be configured. In one case, a long PUCCH in a slot may cover all available UL symbols in the slot. If a short PUCCH region is configured, the long PUCCH may exclude the symbols reserved for short PUCCH. For dynamic TDD case, if the slots have different slot format, e.g. DL and UL allocations, for a multi-slot long PUCCH, several methods may be considered.

In one method, the long PUCCH in a slot with a given duration in the slot may start from the first available UL symbol in the slot. Or more generally, the long PUCCH in a slot with a given duration in the slot may start from a configured symbol position in the slot.

In another method 675, the long PUCCH in a slot with a given duration in the slot may end at the last UL symbol in the slot. Or more generally, the long PUCCH in a slot with a given duration in the slot may end at a configured symbol position in the slot.

In yet another method 677, a UE may be configured with short PUCCH region in some slots, e.g. on the last or two symbols. For a long PUCCH spans over multiple slots, if a short PUCCH region is configured, the long PUCCH with the given duration in the slot may end immediately before the configured short PUCCH region.

In still another method, besides the long PUCCH duration, the starting symbol or the ending symbols may be configured for each slot.

Figure 7:
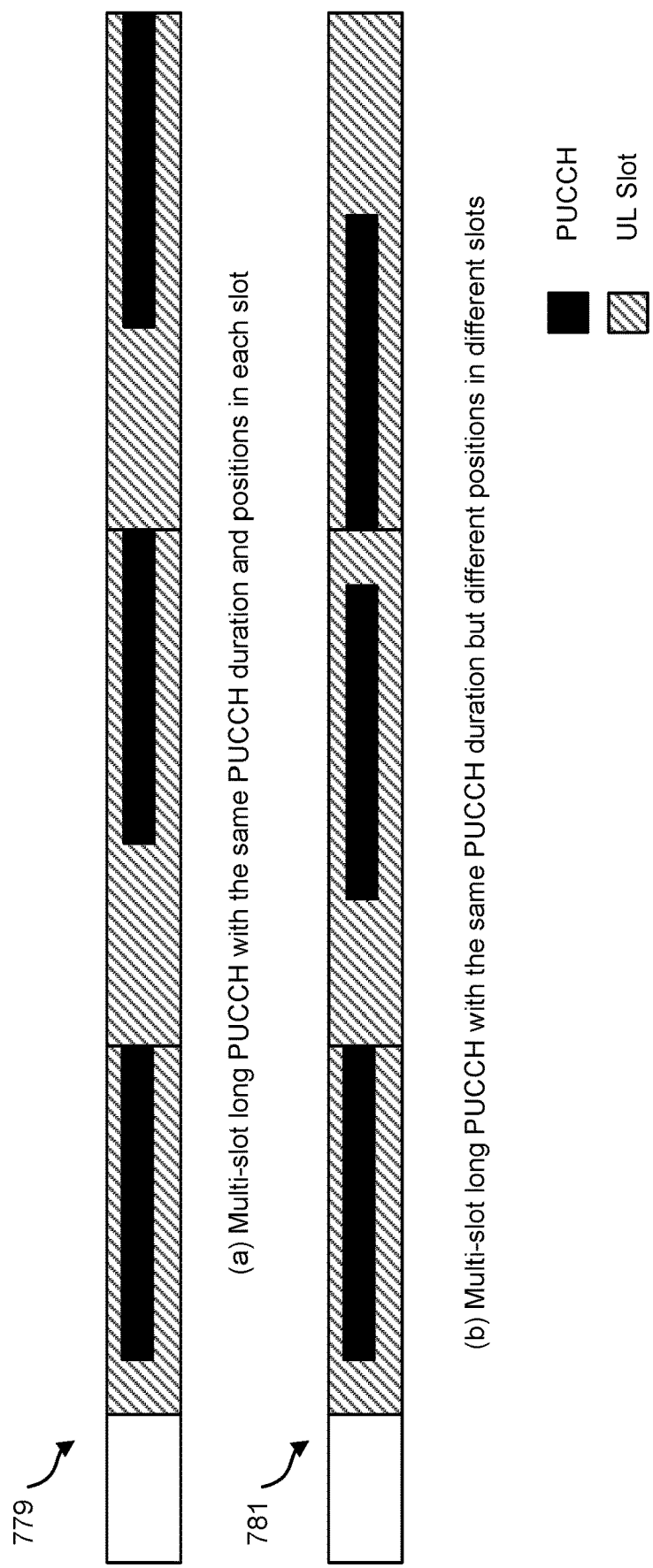
FIG. 7 is a diagram illustrating some examples of multi-slot long PUCCH with the same duration in all slots.

FIG. 7 is a diagram illustrating some examples 779 and/or 781 of multi-slot long PUCCH with the same duration in all slots. For long PUCCH over multi-slots, for the case in which duration of long PUCCH in each slot may be different, the number of slots with long PUCCH transmission may be configurable in a UE-specific manner. Up to 4 possible RRC configured numbers may be considered.

In the fourth case, the same methods to configure/determine the number of slots may be applied as in the third case. Similarly, the conflict handling with SFI of the third case may be reused on the fourth case. In a slot where long PUCCH is configured, if the SFI indicates a conflicting UL symbol allocation, e.g. the number of UL symbols indicated in the SFI is less than the configured long PUCCH duration, or one or more symbols in the configured long PUCCH duration are indicated as DL symbol(s), the long PUCCH may not be transmitted as configured. Several methods can be considered.

In one method, a punctured version of the long PUCCH may be transmitted. Thus, the PUCCH symbols may not be transmitted in conflicting symbols with SFI. This may cause degradation of long PUCCH in the given slot. Different from long PUCCH with the same duration, two approaches may be considered for the puncture version of the long PUCCH transmission in the slot. In one approach, the PUCCH structure itself may not be modified, e.g. the DMRS location and UCI encoding and loading may be the same as a long PUCCH without puncturing. In another approach, since different long PUCCH formats in different slots may already be supported, the long PUCCH in the given slot may be adjusted based on the available UL symbols of the punctured long PUCCH, i.e. the DMRS location and UCI encoding/loading may be modified based on the new long PUCCH structure after puncturing.

In another method, the long PUCCH may be dropped in the given slot. Thus, the actual transmitted number of slots for the multi-slot PUCCH may be reduced.

In yet another method, the long PUCCH may be dropped in the given slot, but to maintain the performance of multi-slot PUCCH, the long PUCCH may be extended to the later slots so that the actual transmitted number of slots N may still be the same as configured. Note this may cause some collision issue with the same or other UEs using a later slot. Furthermore, since the long PUCCH in different slots may be different, the consecutive long PUCCH transmissions may follow the configured long PUCCH structure of the given slot. In the extended slot, the long PUCCH structure of the dropped slot may be used, or the long PUCCH structure in the extended slot may follow the UL allocation of the given slot.

Figure 8:
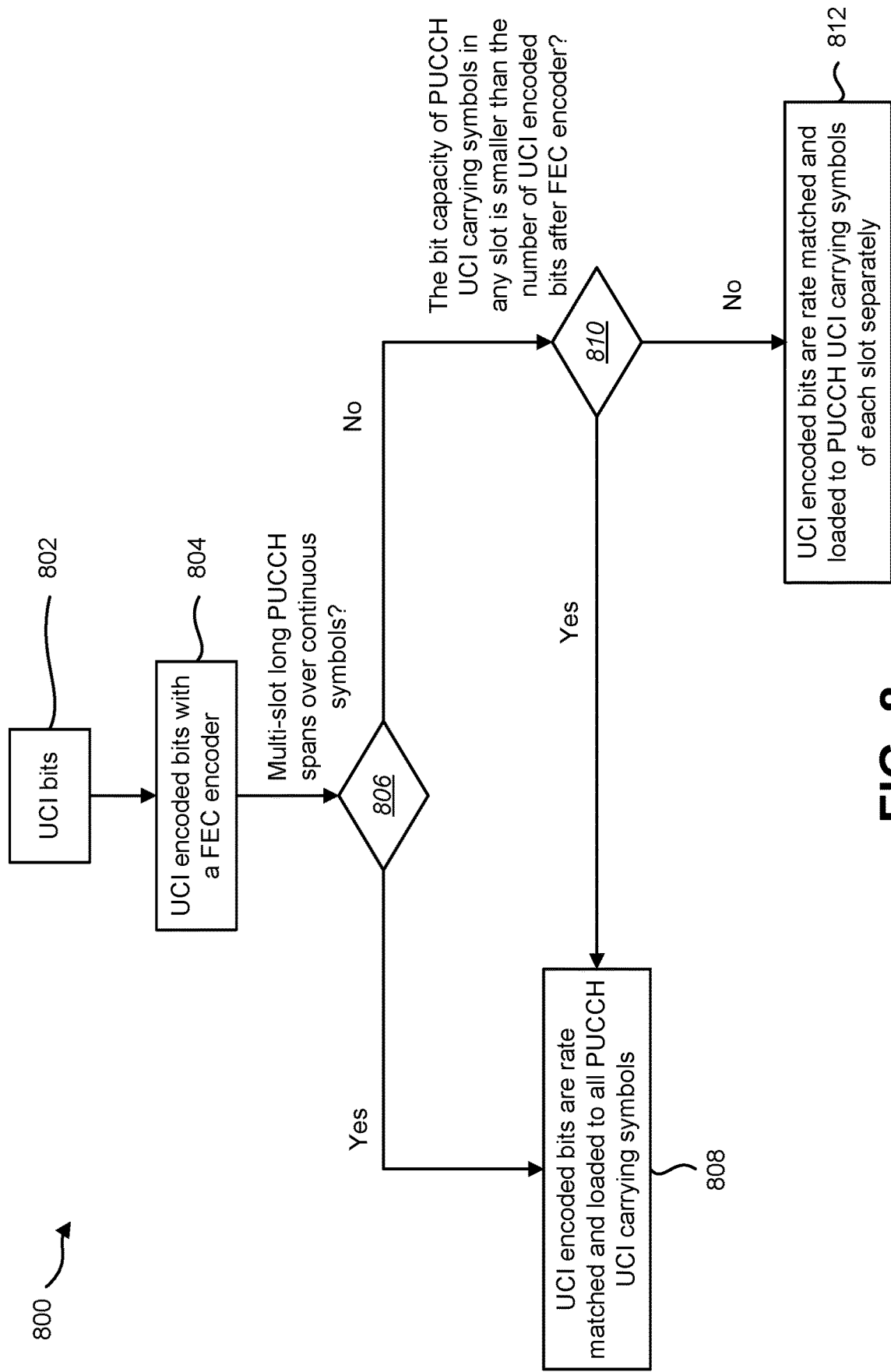
FIG. 8 is a diagram illustrating an example of uplink control information (UCI) encoding and rate matching into a multi-slot long PUCCH.

FIG. 8 is a diagram illustrating an example 800 of UCI encoding and rate matching into a multi-slot long PUCCH. Since each slot may be viewed as a long PUCCH within a slot, a multi-slot may be considered as a long PUCCH repetition over multiple slots. For UCI encoding and rate matching on multi-slot long PUCCH with gaps among slots, several methods can be considered.

In a first method, joint encoding and rate matching over all available UCI carrying symbols may be considered. The UCI may be encoded and the encoded bits may be rate matched to all UCI carrying symbols of the multi-slot long PUCCH. Similar to a long PUCCH within a slot, i.e. OCC may be applied in frequency domain and/or time domain over all UCI carrying symbols in the long PUCCH.

In a second method, joint UCI encoding with separate rate matching and bit loading to each slot may be considered. The UCI may be encoded. The encoding output may be rate matched to the available UCI carrying symbols in each slot independently. With this method, each slot may be viewed as a long PUCCH, and the same UCI may be encoded and repeated in consecutive long PUCCHs in different slots.

In a third method, the UCI bits may be segmented into multiple segments, each segment for each slot of a multi-slot PUCCH. Each UCI segment may be separately encoded and rate matched to the PUCCH symbols in the given slot. The UCI bits may be segmented proportional to the number of UCI carrying symbols in each slot.

For multi-slot long PUCCH with gaps in between, the third may simplify the UCI encoding in each slot, especially when the UCI payload may be large. On the other hand, it may reduce the joint coding gain of all UCI bits compared with the first method and the second method.

If all slots have the same number of PUCCH symbols, the second method becomes a slot long PUCCH repetition in multiple slots. Thus, the second method may be preferred if possible. However, if different slots have different number of PUCCH symbols, the coding rate may be different in different slots, especially if the number of PUCCH symbols in one or more slots may be too small, the encoded UCI bit may not fit into the available resources. Thus, the first method may be used if the encoded UCI bits may not fit in a single slot.

The first method and the second method may be determined based on the minimum available PUCCH resource in all slots. If the encoded bits may fit in PUCCH UCI carrying symbols in all configured slots, the second method (joint coding with repetition in each slot) may be used. Otherwise, the first method (joint coding and rate matching among all slots) may be used.

With the second method, the rate matching in each slot may be determined by a redundant version (RV) sequence. That is, different RVs of the same encoded UCI may be loaded to different slots. The RV sequence may follow a default sequence. The RV sequence may be configured by higher layer signaling. The sequence may determine if the same RV or different RVs are applied in different slots.

The selection criteria may also be a nominal coding rate. If the available PUCCH UCI carrying symbols in all slots is lower than a nominal coding rate for UCI, the second method may be used. Otherwise, the first method may be used.

Moreover, even if the encoded bits may not fit in PUCCH UCI carrying symbols in all configured slots, the second method may also be used if different redundancy versions of the encoded bits are loaded into different slots. In this case, the gNB may combine the different redundancy versions from multiple slots to decode the UCI.

The UCI bits 802 may be encoded with a forward error correction (FEC) encoder 804. If a multi-slot long PUCCH spans over continuous symbols in multiple slots 806, UCI encoded bits may be rate matched and loaded to all PUCCH UCI carrying symbols of the long PUCCH 808. If a multi-slot long PUCCH spans over multiple slots with gaps between PUCCH symbols, the UE may compare whether the bit capacity of PUCCH carrying symbols in each slot is sufficient to carry all encoded UCI bits 810. If the bit capacity of PUCCH UCI carrying symbols in any slot is smaller than the number of UCI encoded bits 810, UCI encoded bits may be rate matched and loaded to all PUCCH UCI carrying symbols of the long PUCCH 812. If the bit capacity of PUCCH UCI carrying symbols in all slots is greater than or equal to the number of UCI encoded bits, UCI encoded bits may be rate matched and loaded to PUCCH UCI carrying symbols of each slot of the long PUCCH separately 808. As a special case, if the number of PUCCH symbols in each slot is the same, the PUCCH format and encoded UCI in each slot may be repeated in multiple slots.

Figure 9:
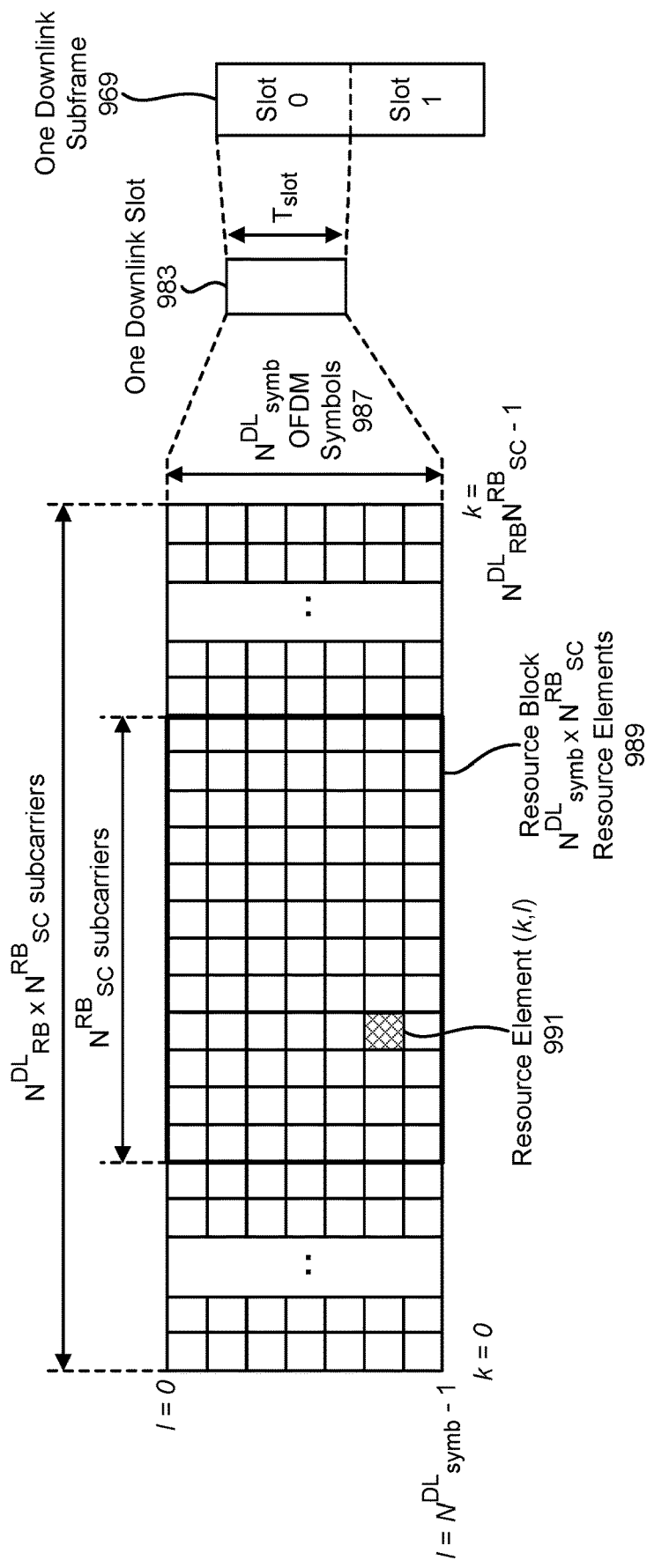
FIG. 9 is a diagram illustrating one example of a resource grid for the downlink.

FIG. 9 is a diagram illustrating one example of a resource grid for the downlink. The resource grid illustrated in FIG. 9 may be utilized in some implementations of the systems and methods disclosed herein. More detail regarding the resource grid is given in connection with FIG. 1.

In FIG. 9, one downlink subframe 969 may include two downlink slots 983. $N^{DL}_{RB}$ is downlink bandwidth configuration of the serving cell, expressed in multiples of $N^{RB}_{sc}$, where $N^{RB}_{sc}$ is a resource block 989 size in the frequency domain expressed as a number of subcarriers, and $N^{DL}_{symb}$ is the number of OFDM symbols 987 in a downlink slot 983. A resource block 989 may include a number of resource elements (RE) 991.

For a PCell, $N^{DL}_{RB}$ is broadcast as a part of system information. For an SCell (including a license assisted access (LAA) SCell), $N^{DL}_{RB}$ is configured by a RRC message dedicated to a UE 102. For PDSCH mapping, the available RE 991 may be the RE 991 whose index 1 fulfils $1 \geq 1_{data,start}$ and/or $1_{data,end} \geq 1$ in a subframe.

In the downlink, the OFDM access scheme with cyclic prefix (CP) may be employed, which may be also referred to as CP-OFDM. In the downlink, PDCCH, enhanced downlink physical control channel (EPDCCH), PDSCH and the like may be transmitted. A downlink radio frame may consist of multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair consists of two downlink RBs that are continuous in the time domain.

The downlink RB consists of twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 10:
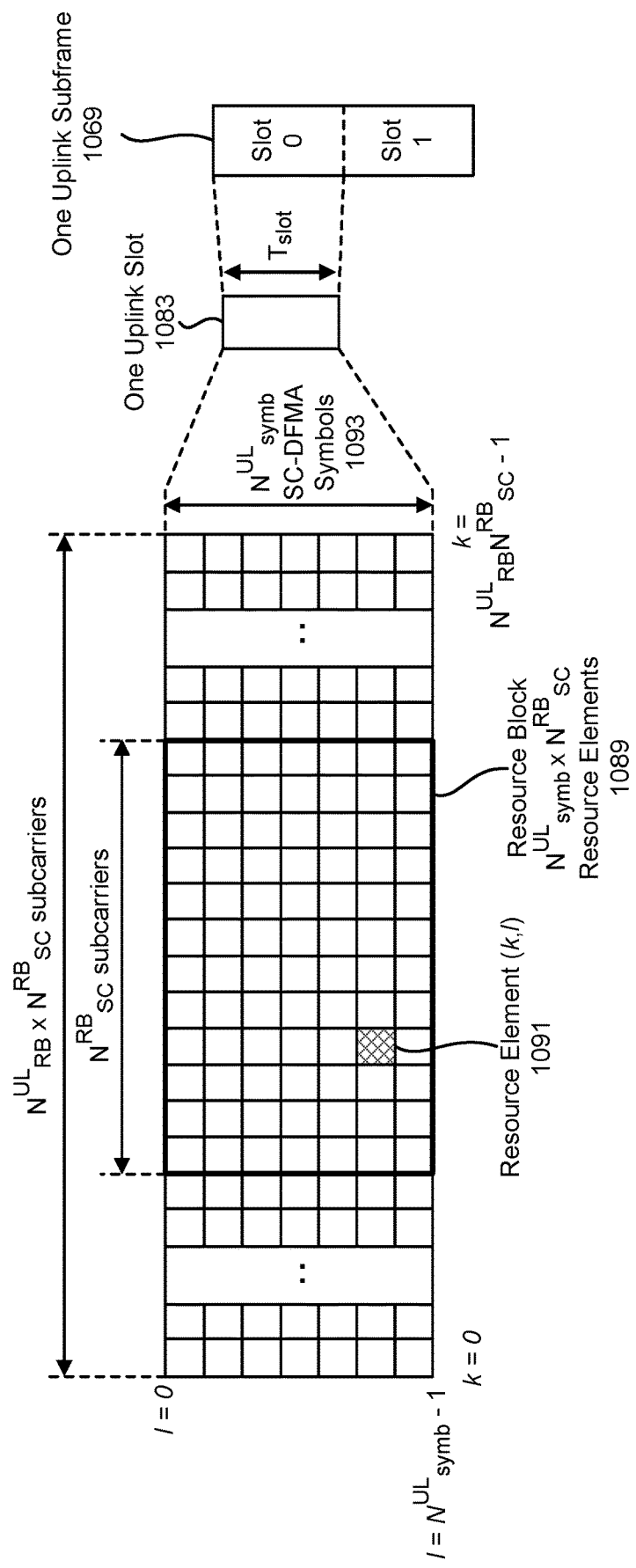
FIG. 10 is a diagram illustrating one example of a resource grid for the uplink.

FIG. 10 is a diagram illustrating one example of a resource grid for the uplink. The resource grid illustrated in FIG. 10 may be utilized in some implementations of the systems and methods disclosed herein. More detail regarding the resource grid is given in connection with FIG. 1.

In FIG. 10, one uplink subframe 1069 may include two uplink slots 1083. $N^{UL}_{RB}$ is uplink bandwidth configuration of the serving cell, expressed in multiples of $N^{RB}_{sc}$, where $N^{RB}_{sc}$ is a resource block 1089 size in the frequency domain expressed as a number of subcarriers, and $N^{UL}_{symb}$ is the number of SC-FDMA symbols 1093 in an uplink slot 1083. A resource block 1089 may include a number of resource elements (RE) 1091.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PDSCH, physical random access channel (PRACH) and the like may be transmitted. An uplink radio frame may consist of multiple pairs of uplink resource blocks. The uplink RB pair is a unit for assigning uplink radio resources, defined by a predetermined bandwidth (RB bandwidth) and a time slot. The uplink RB pair consists of two uplink RBs that are continuous in the time domain.

The uplink RB may consist of twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 11:
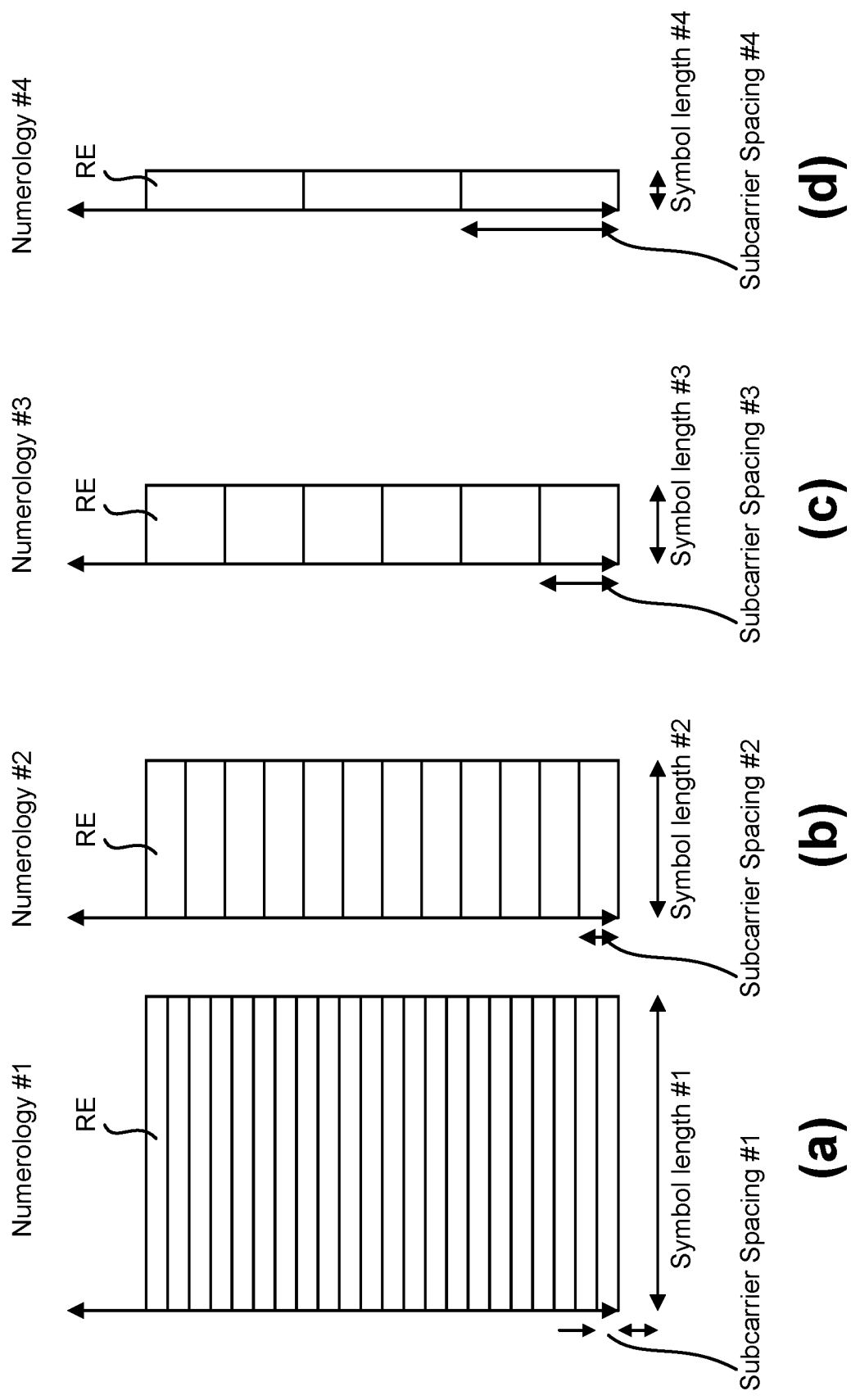
FIG. 11 is a diagram illustrating examples of several numerologies.

FIG. 11 is a diagram illustrating examples of several numerologies. The numerology #1 may be a basic numerology. For example, a RE of the basic numerology is defined with subcarrier spacing of 15 kHz in frequency domain and 2048 Ts+CP length (e.g. 160 Ts or 144 Ts) in time domain, where Ts denotes a baseband sampling time unit defined as 1/(15000*2048) seconds. For the i-th numerology, the subcarrier spacing may be equal to $15*2^i$ and the effective OFDM symbol length 2048*2−i*Ts. It may cause the symbol length is 2048*2−i*Ts+CP length (e.g. 160*2−i*Ts or 144*2−i*Ts). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

Figure 12:
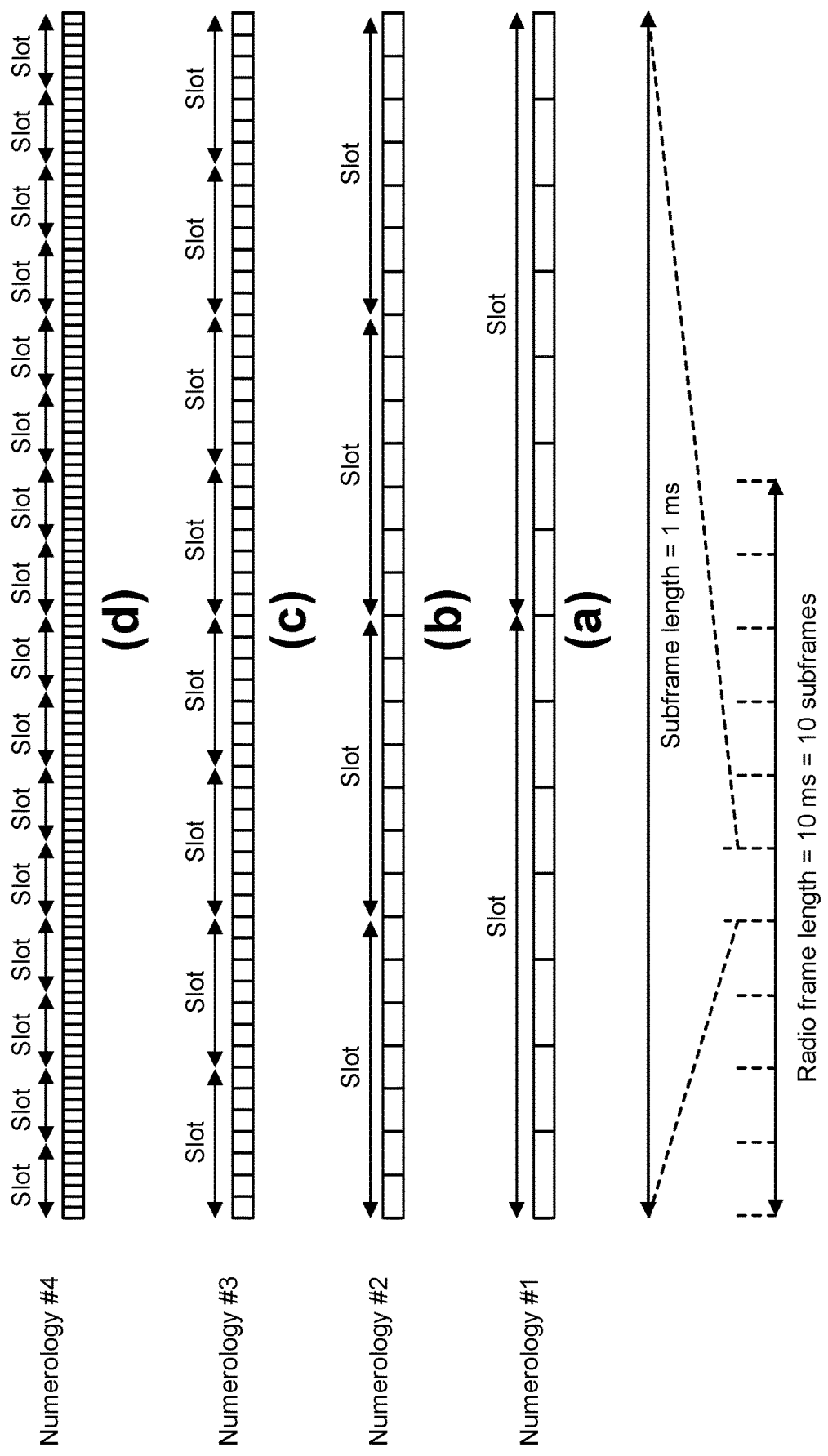
FIG. 12 is a diagram illustrating examples of subframe structures for the numerologies that are shown in FIG. 11.

FIG. 12 is a diagram illustrating examples of subframe structures for the numerologies that are shown in FIG. 11. Given that a slot consists of $N^{DL}_{symb}$ (or $N^{UL}_{symb}$)=7 symbols, the slot length of the i+1-th numerology is a half of the one for the i-th numerology, and eventually the number of slots in a subframe (i.e., 1 ms) becomes double. It may be noted that a radio frame may consists of 10 subframes, and the radio frame length may be equal to 10 ms.

Figure 13:
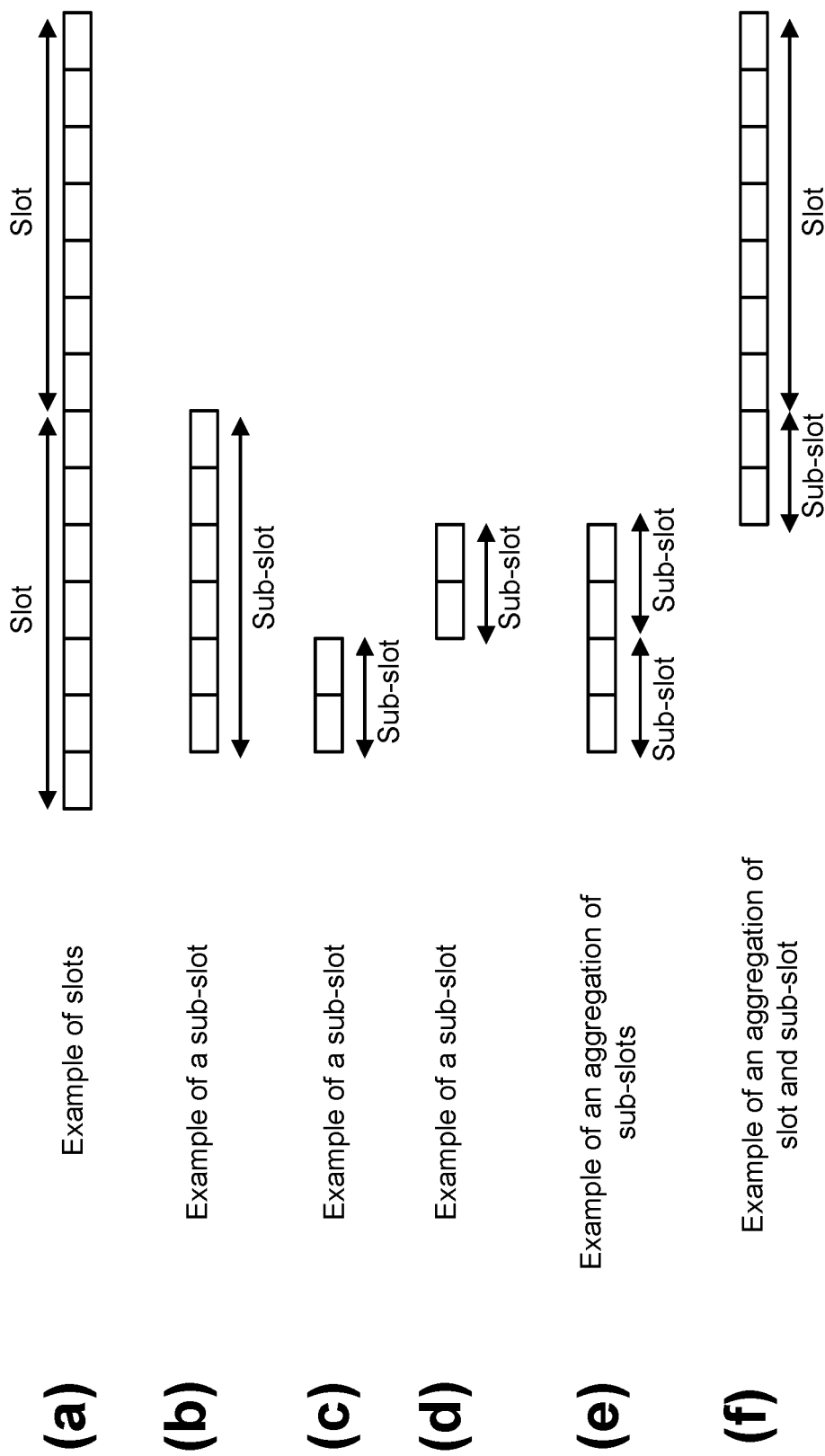
FIG. 13 is a diagram illustrating examples of slots and sub-slots.

FIG. 13 is a diagram illustrating examples of slots and sub-slots. If sub-slot is not configured by higher layer, the UE 102 and the eNB/gNB 160 may only use a slot as a scheduling unit. More specifically, a given transport block may be allocated to a slot. If the sub-slot is configured by higher layer, the UE 102 and the eNB/gNB 160 may use the sub-slot as well as the slot. The sub-slot may consist of one or more OFDM symbols. The maximum number of OFDM symbols that constitute the sub-slot may be $N^{DL}_{symb}-1$ (or $N^{UL}_{symb}-1$).

The sub-slot length may be configured by higher layer signaling. Alternatively, the sub-slot length may be indicated by a physical layer control channel (e.g. by DCI format).

The sub-slot may start at any symbol within a slot unless it collides with a control channel. There could be restrictions of mini-slot length based on restrictions on starting position. For example, the sub-slot with the length of $N^{DL}_{symb}-1$ (or $N^{UL}_{symb}-1$) may start at the second symbol in a slot. The starting position of a sub-slot may be indicated by a physical layer control channel (e.g. by DCI format). Alternatively, the starting position of a sub-slot may be derived from information (e.g. search space index, blind decoding candidate index, frequency and/or time resource indices, PRB index, a control channel element index, control channel element aggregation level, an antenna port index, etc.) of the physical layer control channel which schedules the data in the concerned sub-slot.

In cases when the sub-slot is configured, a given transport block may be allocated to either a slot, a sub-slot, aggregated sub-slots or aggregated sub-slot(s) and slot. This unit may also be a unit for HARQ-ACK bit generation.

Figure 14:
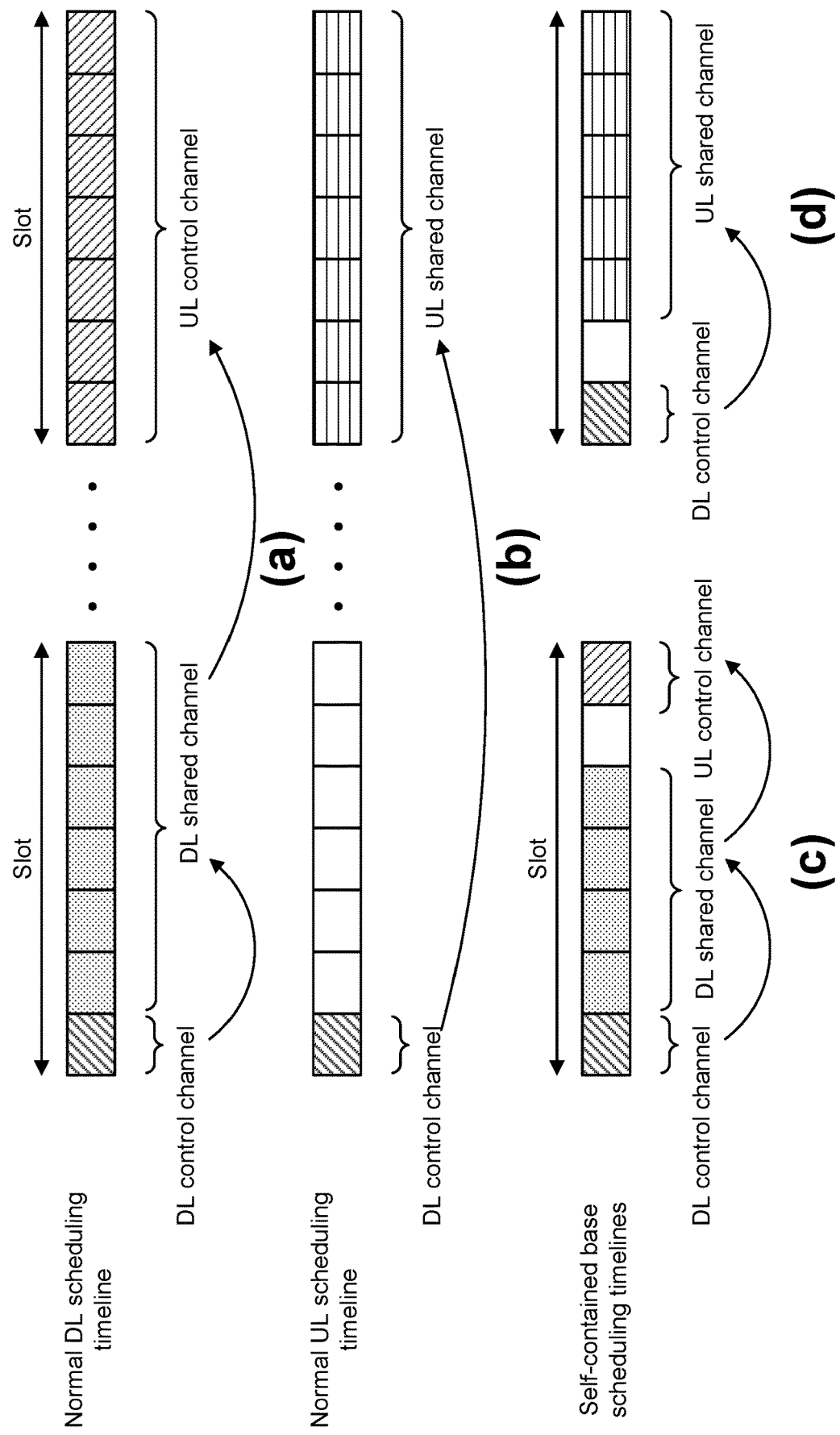
FIG. 14 is a diagram illustrating examples of scheduling timelines.

FIG. 14 is a diagram illustrating examples of scheduling timelines. For a normal DL scheduling timeline, DL control channels are mapped the initial part of a slot. The DL control channels schedule DL shared channels in the same slot. HARQ-ACKs for the DL shared channels (i.e. HARQ-ACKs each of which indicates whether or not transport block in each DL shared channel is detected successfully) are reported via UL control channels in a later slot. In this instance, a given slot may contain either one of DL transmission and UL transmission. For a normal UL scheduling timeline, DL control channels are mapped the initial part of a slot. The DL control channels schedule UL shared channels in a later slot. For these cases, the association timing (time shift) between the DL slot and the UL slot may be fixed or configured by higher layer signaling. Alternatively, it may be indicated by a physical layer control channel (e.g. the DL assignment DCI format, the UL grant DCI format, or another DCI format such as UE-common signaling DCI format which may be monitored in common search space).

For a self-contained base DL scheduling timeline, DL control channels are mapped to the initial part of a slot. The DL control channels schedule DL shared channels in the same slot. HARQ-ACKs for the DL shared channels are reported in UL control channels which are mapped at the ending part of the slot. For a self-contained base UL scheduling timeline, DL control channels are mapped to the initial part of a slot. The DL control channels schedule UL shared channels in the same slot. For these cases, the slot may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g. PDSCH, PUSCH, PUCCH, etc.).

FIG. 15 is a diagram illustrating examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include demodulation reference signal (DM-RS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 16:
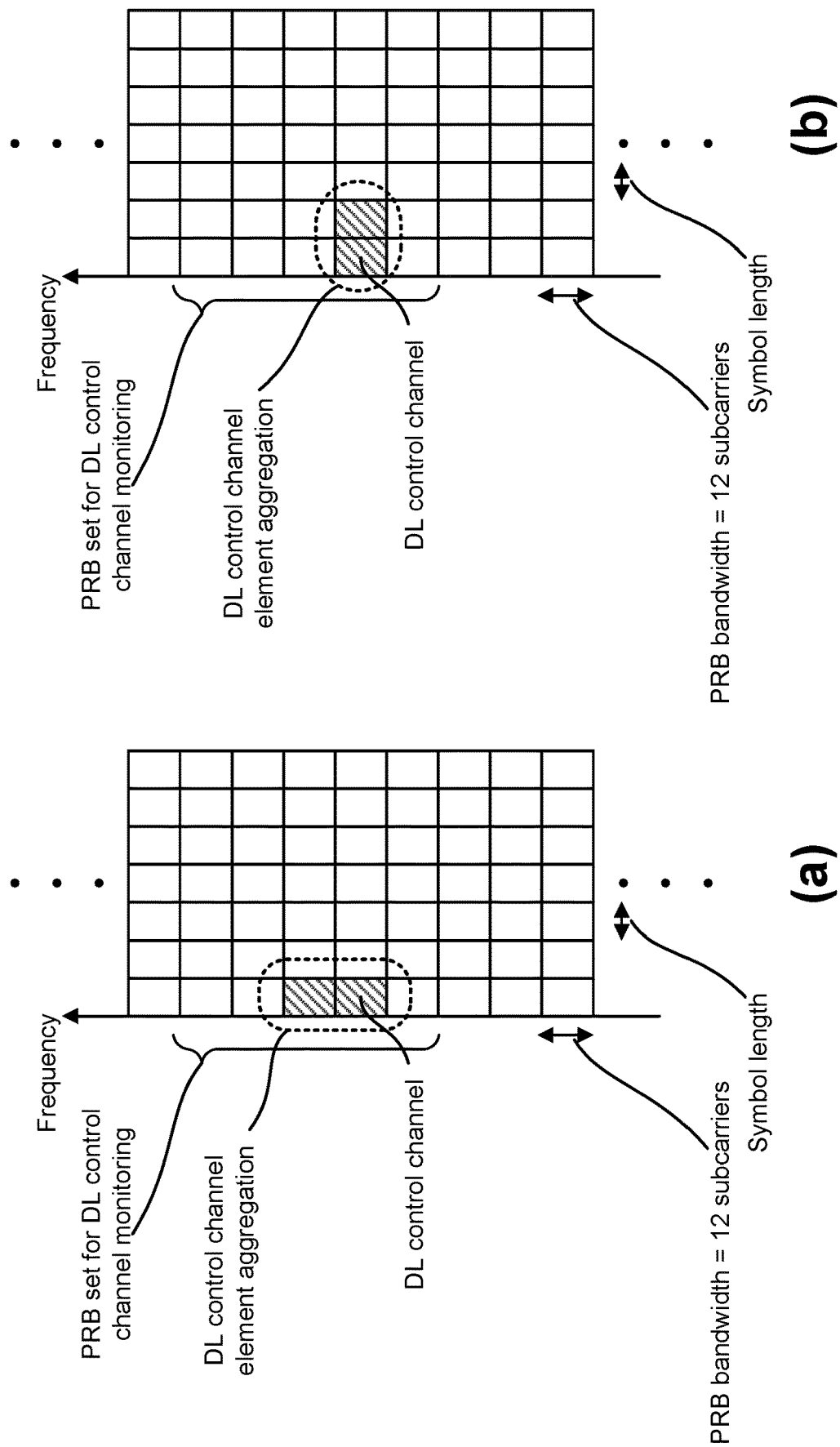
FIG. 16 is a diagram illustrating examples of DL control channel which consists of more than one control channel elements.

FIG. 16 is a diagram illustrating examples of DL control channel which consists of more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 17:
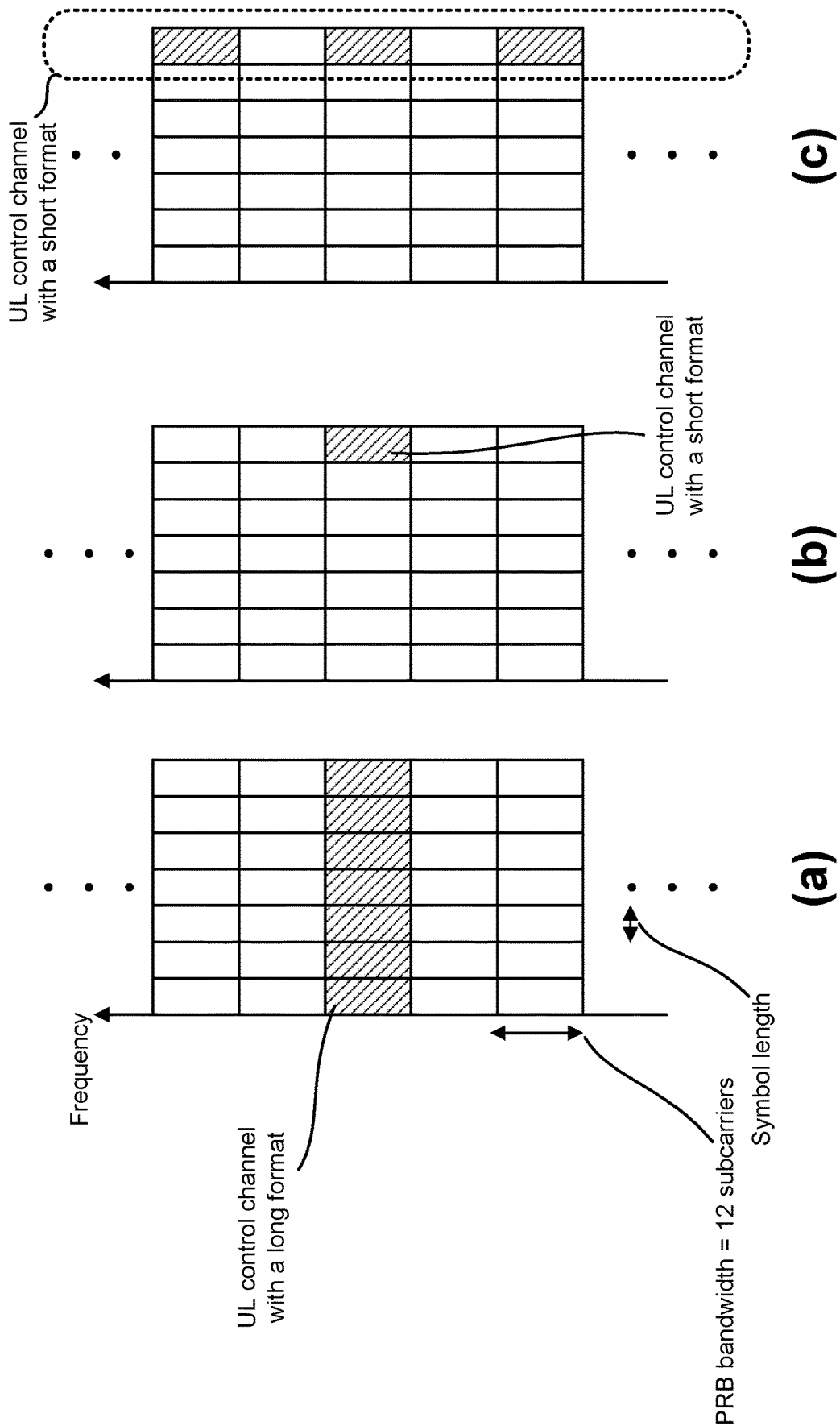
FIG. 17 is a diagram illustrating examples of UL control channel structures.

FIG. 17 is a diagram illustrating examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g. 5 or 10) within a system bandwidth.

Figure 18:
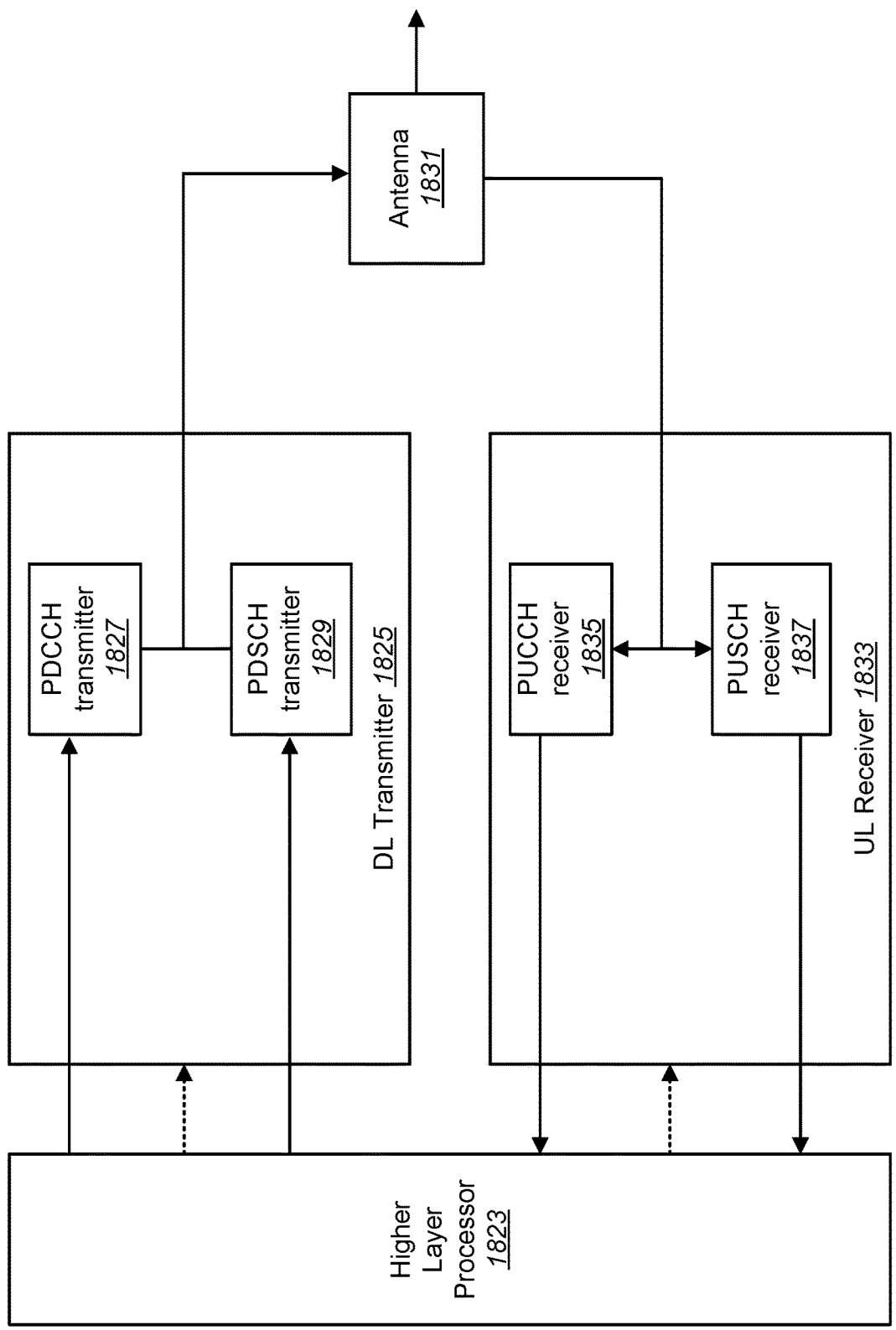
FIG. 18 is a block diagram illustrating one implementation of a gNB.

FIG. 18 is a block diagram illustrating one implementation of a gNB 1860. The gNB 1860 may include a higher layer processor 1823, a DL transmitter 1825, a UL receiver 1833, and antennas 1831. The DL transmitter 1825 may include a PDCCH transmitter 1827 and a PDSCH transmitter 1829. The UL receiver 1833 may include a PUCCH 1835 receiver and a PUSCH receiver 1837. The higher layer processor 1823 may manage physical layer's behaviors (the DL transmitter's and the UL receiver's behaviors) and provide higher layer parameters to the physical layer. The higher layer processor 1823 may obtain transport blocks from the physical layer. The higher layer processor 1823 may send/acquire higher layer messages such as an RRC message and MAC message to/from a UE's higher layer. The higher layer processor 1823 may provide the PDSCH transmitter 1829 transport blocks and provide the PDCCH transmitter 1827 transmission parameters related to the transport blocks. The UL receiver 1833 may receive multiplexed uplink physical channels and uplink physical signals via receiving antennas 1831 and de-multiplex them. The PUCCH receiver 1835 may provide the higher layer processor UCI. The PUSCH receiver 1837 may provide the higher layer processor received transport blocks.

Figure 19:
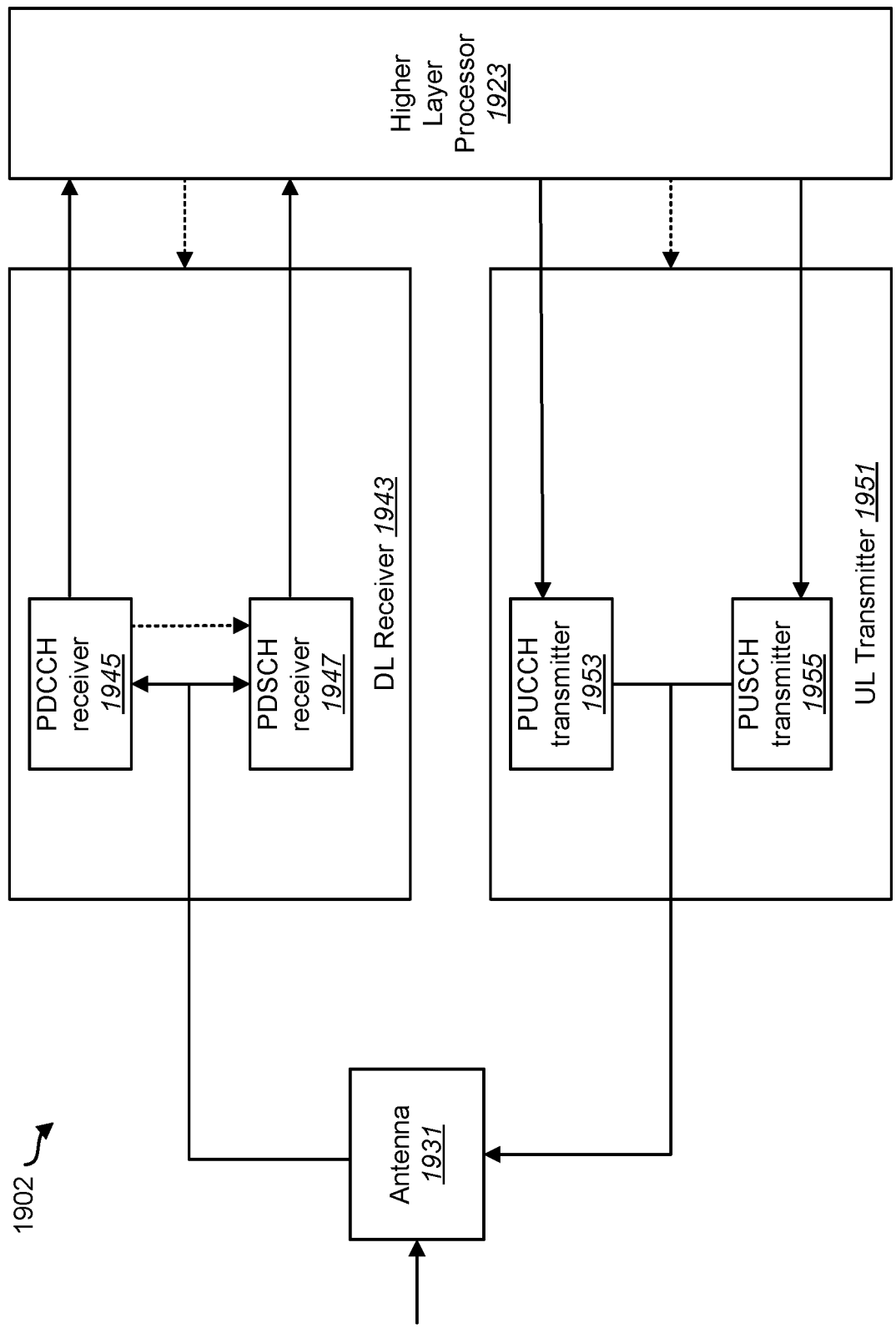
FIG. 19 is a block diagram illustrating one implementation of a UE.

FIG. 19 is a block diagram illustrating one implementation of a UE 1902. The UE 1902 may include a higher layer processor 1923, a UL transmitter 1951, a DL receiver 1943, and antennas 1931. The UL transmitter 1951 may include a PUCCH transmitter 1953 and a PUSCH transmitter 1955. The DL receiver 1943 may include a PDCCH receiver 1945 and a PDSCH receiver 1947. The higher layer processor 1923 may manage physical layer's behaviors (the UL transmitter's and the DL receiver's behaviors) and provide higher layer parameters to the physical layer. The higher layer processor 1923 may obtain transport blocks from the physical layer. The higher layer processor 1923 may send/acquire higher layer messages such as an RRC message and MAC message to/from a UE's higher layer. The higher layer processor 1923 may provide the PUSCH transmitter 1955 transport blocks and provide the PUCCH transmitter 1953 UCI. The DL receiver 1943 may receive multiplexed downlink physical channels and downlink physical signals via receiving antennas 1931 and de-multiplex them. The PDCCH receiver 1945 may provide the higher layer processor 1923 DCI. The PDSCH receiver 1947 may provide the higher layer processor 1923 received transport blocks.

It should be noted that names of physical channels described herein are examples. The other names such as "New Radio (NR)PDCCH, NRPDSCH, NRPUCCH and NRPUSCH", "new Generation-(G)PDCCH, GPDSCH, GPUCCH and GPUSCH" or the like can be used.

Figure 20:
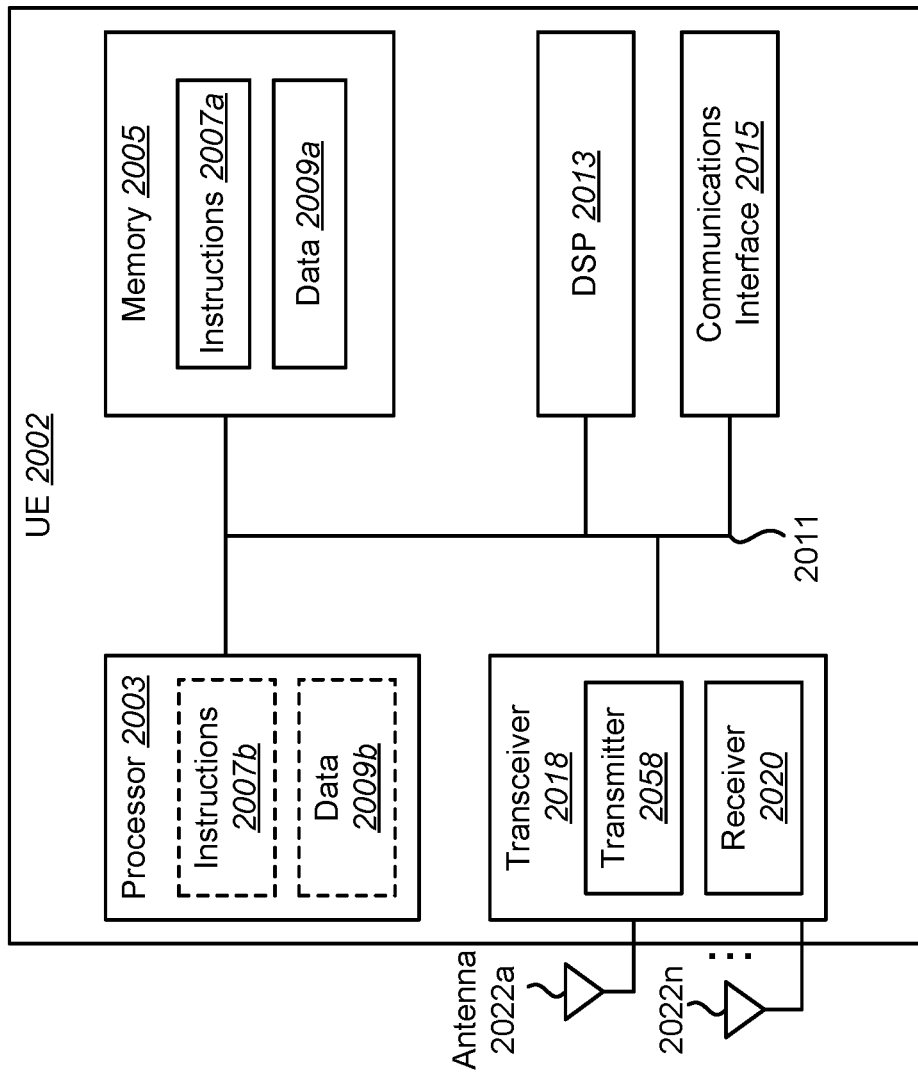
FIG. 20 illustrates various components that may be utilized in a UE.

FIG. 20 illustrates various components that may be utilized in a UE 2002. The UE 2002 described in connection with FIG. 20 may be implemented in accordance with the UE 102 described in connection with FIG. 1. The UE 2002 includes a processor 2003 that controls operation of the UE 2002. The processor 2003 may also be referred to as a central processing unit (CPU). Memory 2005, which may include read-only memory (ROM), random access memory (RAM), a combination of the two or any type of device that may store information, provides instructions 2007a and data 2009a to the processor 2003. A portion of the memory 2005 may also include non-volatile random access memory (NVRAM). Instructions 2007b and data 2009b may also reside in the processor 2003. Instructions 2007b and/or data 2009b loaded into the processor 2003 may also include instructions 2007a and/or data 2009a from memory 2005 that were loaded for execution or processing by the processor 2003. The instructions 2007b may be executed by the processor 2003 to implement the methods described above.

The UE 2002 may also include a housing that contains one or more transmitters 2058 and one or more receivers 2020 to allow transmission and reception of data. The transmitter(s) 2058 and receiver(s) 2020 may be combined into one or more transceivers 2018. One or more antennas 2022a-n are attached to the housing and electrically coupled to the transceiver 2018.

The various components of the UE 2002 are coupled together by a bus system 2011, which may include a power bus, a control signal bus and a status signal bus, in addition to a data bus. However, for the sake of clarity, the various buses are illustrated in FIG. 20 as the bus system 2011. The UE 2002 may also include a digital signal processor (DSP) 2013 for use in processing signals. The UE 2002 may also include a communications interface 2015 that provides user access to the functions of the UE 2002. The UE 2002 illustrated in FIG. 20 is a functional block diagram rather than a listing of specific components.

Figure 21:
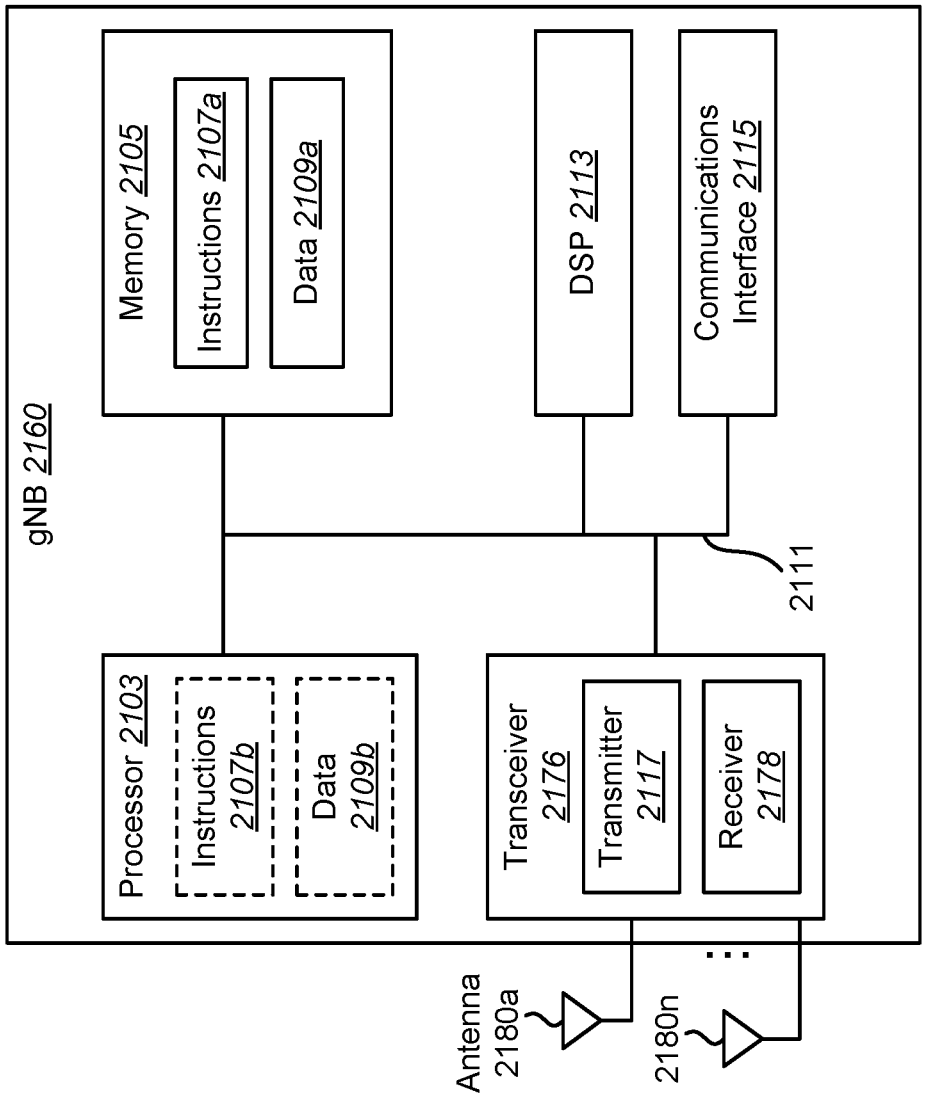
FIG. 21 illustrates various components that may be utilized in a gNB.

FIG. 21 illustrates various components that may be utilized in a gNB 2160. The gNB 2160 described in connection with FIG. 21 may be implemented in accordance with the gNB 160 described in connection with FIG. 1. The gNB 2160 includes a processor 2103 that controls operation of the gNB 2160. The processor 2103 may also be referred to as a central processing unit (CPU). Memory 2105, which may include read-only memory (ROM), random access memory (RAM), a combination of the two or any type of device that may store information, provides instructions 2107a and data 2109a to the processor 2103. A portion of the memory 2105 may also include non-volatile random access memory (NVRAM). Instructions 2107b and data 2109b may also reside in the processor 2103. Instructions 2107b and/or data 2109b loaded into the processor 2103 may also include instructions 2107a and/or data 2109a from memory 2105 that were loaded for execution or processing by the processor 2103. The instructions 2107b may be executed by the processor 2103 to implement the methods described above.

The gNB 2160 may also include a housing that contains one or more transmitters 2117 and one or more receivers 2178 to allow transmission and reception of data. The transmitter(s) 2117 and receiver(s) 2178 may be combined into one or more transceivers 2176. One or more antennas 2180a-n are attached to the housing and electrically coupled to the transceiver 2176.

The various components of the gNB 2160 are coupled together by a bus system 2111, which may include a power bus, a control signal bus and a status signal bus, in addition to a data bus. However, for the sake of clarity, the various buses are illustrated in FIG. 21 as the bus system 2111. The gNB 2160 may also include a digital signal processor (DSP) 2113 for use in processing signals. The gNB 2160 may also include a communications interface 2115 that provides user access to the functions of the gNB 2160. The gNB 2160 illustrated in FIG. 21 is a functional block diagram rather than a listing of specific components.

Figure 22:
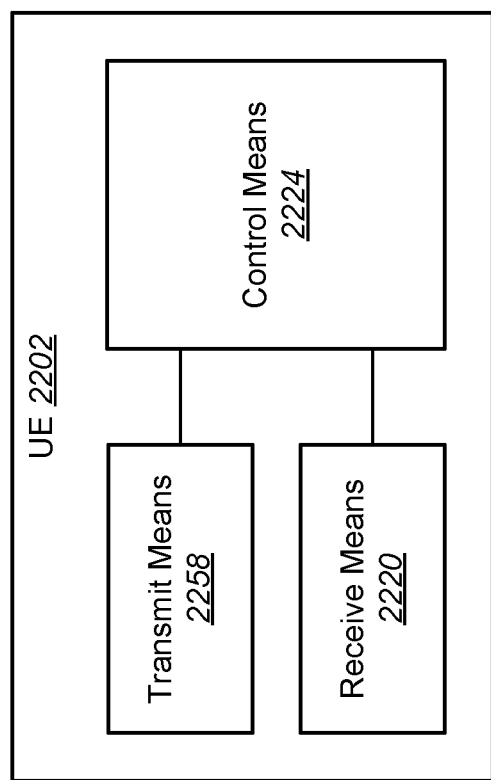
FIG. 22 is a block diagram illustrating one implementation of a UE in which systems and methods for a long PUCCH design for 5G NR operations may be implemented.

FIG. 22 is a block diagram illustrating one implementation of a UE 2202 in which systems and methods for a long PUCCH design for 5G NR operations may be implemented. The UE 2202 includes transmit means 2258, receive means 2220 and control means 2224. The transmit means 2258, receive means 2220 and control means 2224 may be configured to perform one or more of the functions described in connection with FIG. 1 above. FIG. 20 above illustrates one example of a concrete apparatus structure of FIG. 22. Other various structures may be implemented to realize one or more of the functions of FIG. 1. For example, a DSP may be realized by software.

Figure 23:
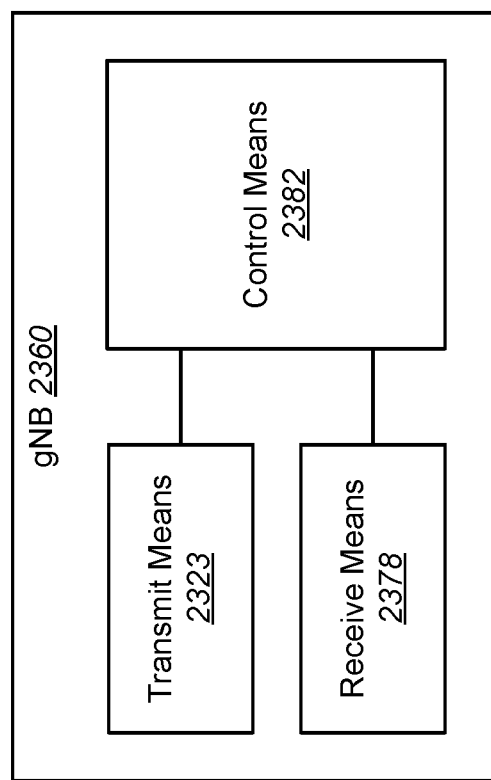
FIG. 23 is a block diagram illustrating one implementation of a gNB in which systems and methods for a long PUCCH design for 5G NR operations may be implemented.

FIG. 23 is a block diagram illustrating one implementation of a gNB 2360 in which systems and methods for a long PUCCH design for 5G NR operations may be implemented. The gNB 2360 includes transmit means 2317, receive means 2378 and control means 2382. The transmit means 2317, receive means 2378 and control means 2382 may be configured to perform one or more of the functions described in connection with FIG. 1 above. FIG. 21 above illustrates one example of a concrete apparatus structure of FIG. 23. Other various structures may be implemented to realize one or more of the functions of FIG. 1. For example, a DSP may be realized by software.

Figure 24:
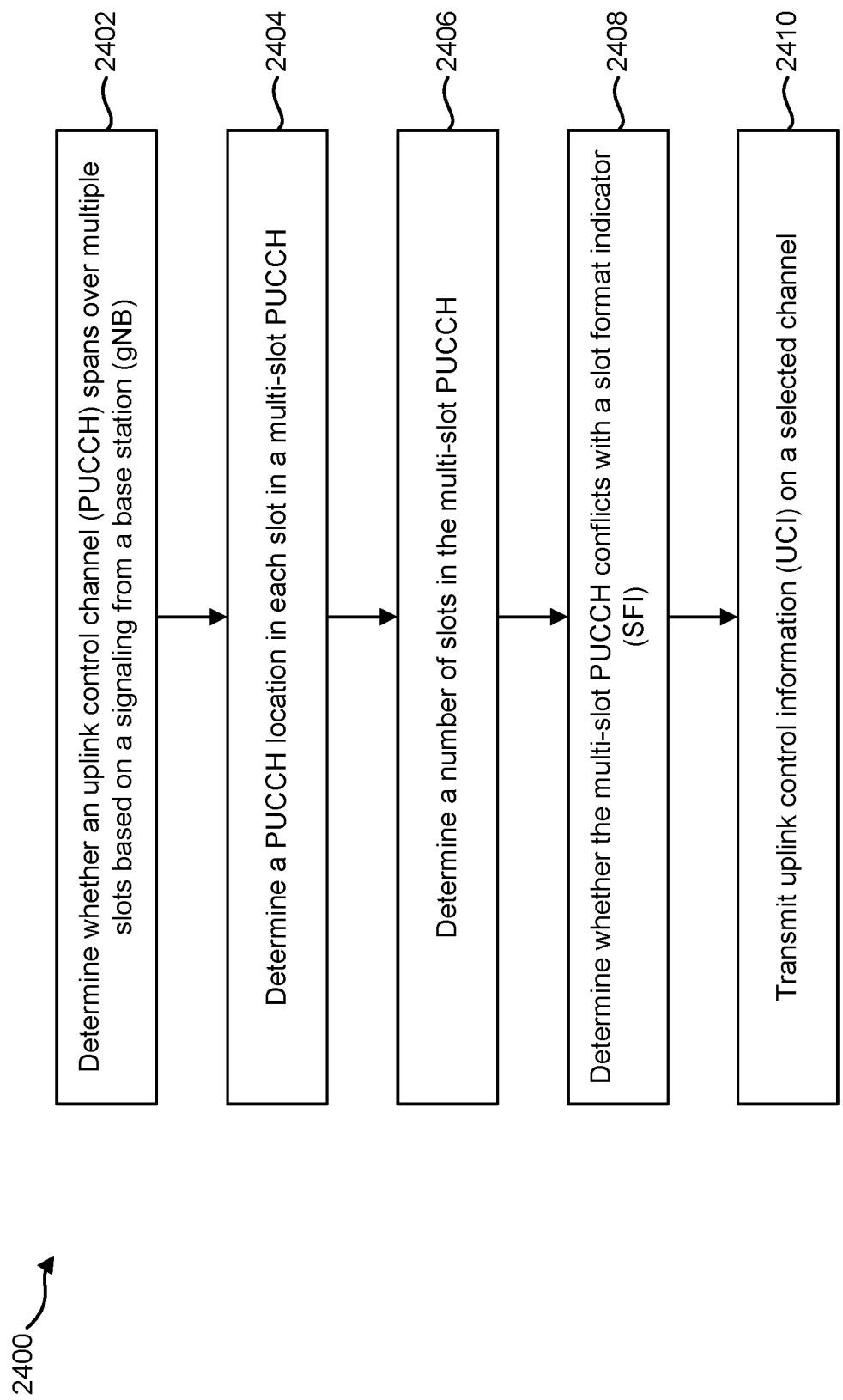
FIG. 24 is a flow diagram illustrating a method for implementing a multiple slot long PUCCH design for 5G NR.

FIG. 24 is a flow diagram illustrating a method 2400 for implementing a multiple slot long PUCCH design for 5G NR. The method 2400 may be implemented by a UE 102. The UE 102 may determine 2402 whether an uplink control channel (PUCCH) spans over multiple slots based on a signaling from a base station (gNB).

The UE 102 may determine 2404 a PUCCH location in each slot in a multi-slot PUCCH. In one configuration, determining the PUCCH location in each slot in the multi-slot PUCCH may include determining whether each slot includes the same starting and ending positions and duration based on a radio resource control (RRC) configuration. In another configuration, determining the PUCCH location in each slot in the multi-slot PUCCH may include determining whether different slots include different starting and ending positions and durations based on a radio resource control (RRC) configuration. In yet another configuration, determining the PUCCH location in each slot in the multi-slot PUCCH may include determining whether different slots include different starting and ending positions and durations based on information derived from an SFI and/or a short PUCCH configuration.

In one example in which the PUCCH location spans over all available UL symbols, if short PUCCH is configured on the last 1 or 2 symbols, the symbols configured with short PUCCH may not be allocated for long PUCCH. In another example in which the duration is configured or indicated and the starting and ending may be implicitly or explicitly indicated or configured, two approaches may be considered.

In the first approach, the starting is indicated or configured from a first (or a configured index number) UL symbol. In the second approach, the ending is indicated or configured at the last (or a configured index number) UL symbol.

The UE may determine 2406 a number of slots in the multi-slot PUCCH. In one configuration, determining the number of slots in the multi-slot PUCCH may comprise counting a number of slots with long PUCCH allocations. Continuous slots may be allocated for frequency division duplexing (FDD), consecutive uplink slots may be allocated for slot level time division duplexing (TDD), and the long PUCCH may follow a pattern than includes slot gaps.

In an example, the number of slots in a multi-slot PUCCH may be configurable with up to 4 RRC configured values. The number of slots may be counted based on the slots with actual long PUCCH allocations. For FDD, continuous slots may be allocated. For slot level TDD, consecutive UL slots may be allocated and may include gaps from DL allocations. For all cases, consecutive UL slots may be allocated and may include gaps from DL allocations.

The UE 102 may determine whether the multi-slot PUCCH conflicts with a slot format indication (SFI). In one configuration, determining whether the multi-slot PUCCH conflicts with an SLI may include determining whether a long PUCCH includes a symbol with a different allocation. In one example, the UE 102 may further transmit a punctured long PUCCH by dropping conflicting symbols. In another example, the UE 102 may further drop a long PUCCH in a given slot without extension. In yet another example, the UE 102 may drop a long PUCCH in a given slot and to extending a later slot to maintain the number of slots in the multi-slot PUCCH.

The UE 102 may handle SFI conflict with a configured multi-slot long PUCCH in various manners. For example, the long PUCCH may conflict with a SFI if any symbol in the configured long PUCCH duration has a different allocation, i.e. is allocated as a DL instead of an UL symbol. A punctured long PUCCH version may be transmitted by dropping conflicting symbols. The long PUCCH in the given slot may be dropped without extension. The long PUCCH in the given slot may be dropped, but the long PUCCH may be extended to a later slot The UE 102 may transmit 2410 uplink control information (UCI) on a selected channel.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise random access memory (RAM), read-only memory (ROM), electrically erasable programmable memory (EEPROM), CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A user equipment (UE), comprising:
a processor; and
memory in electronic communication with the processor, wherein instructions stored in the memory are executable to:
determine whether an uplink control channel (PUCCH) spans over multiple slots based on a signaling from a base station (gNB);
determine a PUCCH location in each slot in a multi-slot PUCCH;
determine a number of slots in the multi-slot PUCCH;
determine whether the multi-slot PUCCH conflicts with a slot format indication (SFI); and
transmit uplink control information (UCI) on a selected channel.

2. The UE of claim 1, wherein the instructions executable to determine the PUCCH location in each slot in the multi-slot PUCCH comprise instructions executable to determine whether each slot includes the same starting and ending positions and duration based on a radio resource control (RRC) configuration.

3. The UE of claim 1, wherein the instructions executable to determine the PUCCH location in each slot in the multi-slot PUCCH comprise instructions executable to determine whether different slots include different starting and ending positions and durations based on a radio resource control (RRC) configuration.

4. The UE of claim 1, wherein the instructions executable to determine the PUCCH location in each slot in the multi-slot PUCCH comprise instructions executable to determine whether different slots include different starting and ending positions and durations based on information derived from an SLI and/or a short PUCCH configuration.

5. The UE of claim 1, wherein the instructions executable to determine the number of slots in the multi-slot PUCCH comprise instructions executable to count a number of slots with long PUCCH allocations.

6. The UE of claim 5, wherein continuous slots are allocated for frequency division duplexing (FDD), consecutive uplink slots are allocated for slot level time division duplexing (TDD), and a long PUCCH follows a pattern that includes slot gaps.

7. The UE of claim 1, wherein the instructions executable to determine whether the multi-slot PUCCH conflicts with an SLI comprise instructions executable to determine whether a long PUCCH includes a symbol with a different allocation.

8. The UE of claim 7, wherein the instructions are further executable to transmit a punctured long PUCCH by dropping conflicting symbols.

9. The UE of claim 7, wherein the instructions are further executable to drop the long PUCCH in a given slot without extension.

10. The UE of claim 7, wherein the instructions are further executable to drop the long PUCCH in a given slot and to extend a later slot to maintain the number of slots in the multi-slot PUCCH.

11. A method, comprising:
   determining whether an uplink control channel (PUCCH) spans over multiple slots based on a signaling from a base station (gNB);
   determining a PUCCH location in each slot in a multi-slot PUCCH;
   determining a number of slots in the multi-slot PUCCH;
   determining whether the multi-slot PUCCH conflicts with a slot format indication (SFI); and
   transmitting uplink control information (UCI) on a selected channel.

12. The method of claim 11, wherein determining the PUCCH location in each slot in the multi-slot PUCCH comprises determining whether each slot includes the same starting and ending positions and duration based on a radio resource control (RRC) configuration.

13. The method of claim 11, wherein determining the PUCCH location in each slot in the multi-slot PUCCH comprises determining whether different slots include different starting and ending positions and durations based on a radio resource control (RRC) configuration.

14. The method of claim 11, wherein determining the PUCCH location in each slot in the multi-slot PUCCH comprises determining whether different slots include different starting and ending positions and durations based on information derived from an SLI and/or a short PUCCH configuration.

15. The method of claim 11, wherein determining the number of slots in the multi-slot PUCCH comprise counting a number of slots with long PUCCH allocations.

16. The method of claim 15, wherein continuous slots are allocated for frequency division duplexing (FDD), consecutive uplink slots are allocated for slot level time division duplexing (TDD), and a long PUCCH follows a pattern that includes slot gaps.

17. The method of claim 11, wherein determining whether the multi-slot PUCCH conflicts with an SLI comprises determining whether a long PUCCH includes a symbol with a different allocation.

18. The method of claim 17, further comprising transmitting a punctured long PUCCH by dropping conflicting symbols.

19. The method of claim 17, further comprising dropping the long PUCCH in a given slot without extension.

20. The method of claim 17, further comprising dropping the long PUCCH in a given slot and to extend a later slot to maintain the number of slots in the multi-slot PUCCH.

* * * * *